United States Patent
Narath et al.

(10) Patent No.: US 11,412,412 B2
(45) Date of Patent: Aug. 9, 2022

(54) USER PLANE FUNCTION (UPF) SELECTION BASED ON PREDICTED LOAD INFORMATION

(71) Applicant: Cisco Technology, Inc., San Jose, CA (US)

(72) Inventors: Bincy Baburaj Narath, Bangalore (IN); Padmaraj Ramanoudjam, Puducherry (IN); Arun Gunasekaran, Bangalore (IN); Raghavendra Suryanarayanarao Vidyashankar, Bangalore South (IN); Om Prakash Suthar, Bolingbrook, IL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 81 days.

(21) Appl. No.: 16/742,429

(22) Filed: Jan. 14, 2020

(65) Prior Publication Data

US 2021/0219179 A1 Jul. 15, 2021

(51) Int. Cl.
 *H04W 28/08* (2009.01)
 *H04W 76/10* (2018.01)
 *H04W 28/12* (2009.01)

(52) U.S. Cl.
 CPC .......... *H04W 28/08* (2013.01); *H04W 28/12* (2013.01); *H04W 76/10* (2018.02)

(58) Field of Classification Search
 CPC . H04W 72/1257; H04W 24/02; H04W 24/08; H04W 24/10
 See application file for complete search history.

(56) References Cited

U.S. PATENT DOCUMENTS

| | | | |
|---|---|---|---|
| 10,554,738 B1* | 2/2020 | Ren | G06F 11/3409 |
| 11,134,416 B2* | 9/2021 | Kotecha | H04W 28/0236 |
| 2004/0192341 A1 | 9/2004 | Wang et al. | |

(Continued)

OTHER PUBLICATIONS

3GPP, "3rd Generation Partnership Project; Technical Specification Group Services and System Aspects; Study of Enablers for Network Automation for 5G (Release 16)", 3GPP TR 23.791 V16.2.0, Jun. 11, 2019, 124 pages.

(Continued)

*Primary Examiner* — Syed Ali

(74) *Attorney, Agent, or Firm* — Edell, Shapiro & Finnan, LLC

(57) ABSTRACT

When a packet data session is established for a user equipment (UE), a comparative assessment of load information factors from different sets of load information factors associated with a plurality of user plane function (UPF) instances may be performed. Each set of load information factors of a UPF instance may include predicted load information factors indicative of a predicted load at the UPF instance. A UPF instance may be selected for the packet data session of the UE based on the comparative assessment. The comparative assessment may additionally consider a predicted load contribution of the packet data session to be established for the UE. A data analytics function may utilize a model (e.g. a multiple linear regression model) to calculate predicted load contribution factors, where the model is derived based on historical usage data from previous sessions of one or more UEs, for example, data from charging data records (CDRs).

20 Claims, 19 Drawing Sheets

(56) References Cited

U.S. PATENT DOCUMENTS

| | | | | |
|---|---|---|---|---|
| 2010/0077088 | A1* | 3/2010 | Hyun | H04L 12/66 709/228 |
| 2014/0089384 | A1 | 3/2014 | Diaz et al. | |
| 2014/0185581 | A1 | 7/2014 | Senarath et al. | |
| 2015/0310335 | A1 | 10/2015 | Fan et al. | |
| 2016/0080965 | A1 | 3/2016 | Boyle et al. | |
| 2016/0127565 | A1* | 5/2016 | Sharma | H04L 12/1467 455/406 |
| 2017/0078850 | A1 | 3/2017 | Bostick et al. | |
| 2017/0178268 | A1 | 6/2017 | Ishikawa et al. | |
| 2017/0332282 | A1 | 11/2017 | Dao | |
| 2018/0262924 | A1* | 9/2018 | Dao | H04W 72/1257 |
| 2019/0222489 | A1 | 1/2019 | Shan | |
| 2019/0140933 | A1* | 5/2019 | Guim Bernat | H04L 43/08 |
| 2019/0191447 | A1 | 6/2019 | Lee | |
| 2019/0304600 | A1 | 10/2019 | Mogatadakala | |
| 2019/0319704 | A1 | 10/2019 | Murthy et al. | |
| 2019/0356558 | A1 | 11/2019 | Han et al. | |
| 2019/0357298 | A1 | 11/2019 | Li et al. | |
| 2019/0394655 | A1 | 12/2019 | Rahman et al. | |
| 2021/0045091 | A1 | 2/2021 | Arora et al. | |
| 2021/0105665 | A1* | 4/2021 | Bennett | H04W 28/0942 |
| 2021/0105711 | A1* | 4/2021 | Eriksson | H04W 28/0289 |
| 2021/0144517 | A1* | 5/2021 | Guim Bernat | G06F 9/4881 |
| 2022/0095414 | A1* | 3/2022 | Wang | H04L 41/082 |

OTHER PUBLICATIONS

3GPP, "3rd Generation Partnership Project; Technical Specification Group Services and System Aspects; System architecture for the 5G System (5GS); Stage 2 (Release 16)", 3GPP TS 23.501 V16.3.0, Dec. 22, 2019, 417 pages.

3GPP, "3rd Generation Partnership Project; Technical Specification Group Services and System Aspects; Procedures tor the 5G System (5GS); Stage 2 (Release 16)", 3GPP TS 23.502 V16.3.0, Dec. 22, 2019, 558 pages.

3GPP, 3rd Generation Partnership Project; Technical Specification Group Services and System Aspects; Architecture enhancements for 5G System (5GS) to support network data analytics services (Release 16), 3GPP TS 23.288 V16.2.0, Dec. 22, 2019, 57 pages.

International Search Report and Written Opinion in counterpart International Application No. PCT/US2021/012403, dated Apr. 26, 2021, 20 pages.

3GPP, "3rd Generation Partnership Project; Technical Specification Group Services and System Aspects; System Architecture for the 5G System (5GS); Stage 2 (Release 16)", 3GPP TS 23.501 V16.2.0 (Sep. 2019), 391 pages.

3GPP, "3rd Generation Partnership Project; Technical Specification Group Services and System Aspects; Architecture enhancements for 5G System (5GS) to support network data analytics services (Release 16)", 3GPP TS 23.288 V16.1.0 (Sep. 2019), 52 pages.

Mannweiler et al., "5G Mobile Network Architecture", Deliverable D2.3; Final overall architecture, 5G-MoNArch, H2020-ICT-2016-2, Project No. 761445, Version 1, Apr. 30, 2019, 165 pages.

Wireless World Research Forum, "Wireless Big Data of Smart 5G", White Paper 2, OUTLOOK 20, Nov. 2017, 44 pages.

Taneja et al., "Selection of Suitable Mechanisms and Associated Parameters for a Networking Slice in a 5G Network Using Machine Learning Approaches", Technical Disclosure Commons, Jul. 1, 2019, 8 pages.

Mannweiler, Christian, "5G Mobile Network Architecture", Deliverable D2.2; Initial overall architecture and concepts for enabling innovations, H2020-ICT-2016-2, 5G-MoNArch, Project No. 761445, Jun. 30, 2018, 111 pages.

Sultan et al., "Call Detail Records Driven Anomaly Detection and Traffic Prediction in Mobile Cellular Networks", Jul. 2018, 12 pages.

Lee, DongJin et al., "Towards Achieving High Performance in 5G Mobile Packet Core's User Plane Function", White Paper Communications Service Providers User Plane Function, Feb. 2018, 18 pages.

3GPP, "3rd Generation Partnership Project; Technical Specification Group Core Network and Terminals; Interface between the Control Plane and the User Plane Nodes; Stage 3 (Release 16)," 3GPP TS 29.244 V16.0.0, Jun. 2019, 217 pages.

* cited by examiner

| CDR sample |
|---|
| Subscriber identifiers (SUPI, GPSI) |
| Device info (PEI) |
| DDN+S-NSSAI |
| PDN type (IPv4/IPv6/PPP) |
| recordOpeningTime |
| causeForRecClosing |
| chargingCharacteristics (prepaid, postpaid etc) |
| RAT Type (5G, WB-EUTRAN, NB-IoT etc) |
| Access Type (3GPP, non 3GPP etc) |
| UE Time Zone |
| UE location (TAI / Cell-Id) |
| Charging Policy - Rulebase name |
| Usage per rating group (UL, DL data volume, duration, QFIs of flows) |

FIG. 4B

| No | Time_Stamp | Day | Hour_of_the_day | Location | UE_TZ | Device_Type | RAT_Type | Subscription | Duration | BitRate_in_Mbps |
|---|---|---|---|---|---|---|---|---|---|---|
| 0 | 03/03/19 7:00 | Sunday | 7 | Area1 | Home | Cat3 | 5G | prepaid | 17 | 807.422 |
| 1 | 03/03/19 8:00 | Sunday | 8 | Area1 | Home | Cat3 | 5G | prepaid | NaN | 78.0515 |
| 2 | 03/03/19 9:00 | Sunday | 9 | Area3 | Home | Cat3 | 5G | prepaid | NaN | 0.0821431 |
| 3 | 03/03/19 10:00 | Sunday | 10 | Area3 | Home | Cat3 | 5G | prepaid | NaN | 0.867399 |
| 4 | 03/03/19 11:00 | Sunday | 11 | Area3 | Home | Cat3 | 5G | prepaid | NaN | 0.0805611 |
| 5 | 03/03/19 12:00 | Sunday | 12 | Area3 | Home | Cat3 | 5G | prepaid | NaN | 0.0784534 |
| 6 | 03/03/19 13:00 | Sunday | 13 | Area2 | Home | Cat3 | wlan | prepaid | NaN | 898.404 |
| 7 | 03/03/19 14:00 | Sunday | 14 | Area2 | Home | Cat3 | wlan | prepaid | NaN | 87.2812 |
| 8 | 03/03/19 15:00 | Sunday | 15 | Area1 | Home | Cat3 | 5G | prepaid | NaN | 817.337 |
| 9 | 03/03/19 16:00 | Sunday | 16 | Area2 | Home | Cat3 | wlan | prepaid | NaN | 819.345 |
| 10 | 03/03/19 17:00 | Sunday | 17 | Area1 | Home | Cat3 | 5G | prepaid | NaN | 79.968 |
| 11 | 03/03/19 18:00 | Sunday | 18 | Area1 | Home | Cat3 | 5G | prepaid | NaN | 77.197 |
| 12 | 03/03/19 19:00 | Sunday | 19 | Area1 | Home | Cat3 | 5G | prepaid | NaN | 80.7106 |
| 13 | 03/03/19 20:00 | Sunday | 20 | Area1 | Home | Cat3 | 5G | prepaid | NaN | 84.1527 |
| 14 | 03/03/19 21:00 | Sunday | 21 | Area1 | Home | Cat3 | 5G | prepaid | NaN | 82.8572 |
| 15 | 03/03/19 22:00 | Sunday | 22 | Area1 | Home | Cat3 | 5G | prepaid | NaN | 79.3512 |
| 16 | 03/03/19 23:00 | Sunday | 23 | Area1 | Home | Cat3 | 5G | prepaid | NaN | 0.0773604 |
| 17 | 04/03/19 5:00 | Monday | 5 | Area1 | Home | Cat3 | 5G | prepaid | 19 | 0.0769598 |

FIG.9

| Features | Coefficients |
|---|---|
| (Intercept) | 17.46008 |
| DayMonday | -0.16575 |
| DaySaturday | 0.60554 |
| DaySunday | 0.29175 |
| DayThursday | 0.79921 |
| DayTuesday | 1.09405 |
| DayWednesday | 0.33017 |
| Device_TypeCat3 | 0.48216 |
| Subscriptionprepaid | -0.08812 |
| TFC_Hour_of_the_day(4, 5] | -0.01077 |
| TFC_Hour_of_the_day(5, 6] | -1.14953 |
| TFC_Hour_of_the_day(6, 7] | -1.76486 |

FIG. 10

| | |
|---|---|
| (Intercept) | 200.354 |
| DayMonday | -156.941 |
| DaySaturday | 17.919 |
| DaySunday | 1.312 |
| DayThursday | -183.082 |
| DayTuesday | -171.636 |
| DayWednesday | -172.515 |
| LocationArea2 | -23.465 |
| LocationArea3 | -161.407 |
| LocationArea5 | -259.547 |
| Device_TypeCat3 | -42.939 |
| RAT_TypeWLAN | -6.16 |
| Subscriptionprepaid | -11.314 |
| TFC_Hour_of_the_day(0, 4) | -109.62 |
| TFC_Hour_of_the_day(4, 5) | -42.486 |
| TFC_Hour_of_the_day(5, 6) | -67.541 |
| TFC_Hour_of_the_day(6, 7) | 173.875 |
| TFC_Hour_of_the_day(7, 8) | 223.687 |
| TFC_Hour_of_the_day(8, 9) | -10.888 |
| TFC_Hour_of_the_day(9, 10) | 17.58 |
| TFC_Hour_of_the_day(10, 11) | -14.141 |
| TFC_Hour_of_the_day(11, 12) | -3.064 |
| TFC_Hour_of_the_day(12, 13) | -27.479 |
| TFC_Hour_of_the_day(13, 14) | 13.837 |
| TFC_Hour_of_the_day(14, 15) | -13.451 |
| TFC_Hour_of_the_day(15, 16) | -14.869 |
| TFC_Hour_of_the_day(16, 17) | 16.113 |
| TFC_Hour_of_the_day(17, 18) | 144.672 |
| TFC_Hour_of_the_day(18, 19) | 239.308 |
| TFC_Hour_of_the_day(19, 20) | 216.84 |
| TFC_Hour_of_the_day(20, 21) | 237.732 |
| TFC_Hour_of_the_day(21, 22) | 135.767 |
| TFC_Hour_of_the_day(22, 23) | -13.018 |

FIG.12

USER PLANE FUNCTION (UPF) SELECTION BASED ON PREDICTED LOAD INFORMATION

TECHNICAL FIELD

The present disclosure relates generally to communications in mobile networks, and more particularly to User Plane Function (UPF) selection in a mobile network based on predicted load information.

BACKGROUND

Fifth Generation (5G) technology proposes to improve a subscriber's mobile internet experience by providing enhanced data rates and guaranteed Quality of Service (QoS). Enhanced Mobile Broadband (eMBB) is expected to be the primary vertical for 5G for bringing a guaranteed ultra-high-speed mobile broadband to end users spanned across multiple use cases (e.g. Gigabytes in seconds, Three-Dimensional "3D" videos, Augmented Reality "AR," Virtual Reality "VR," and immersive gaming).

Most eMBB users will be allocated with a high data bandwidth during their subscription. Depending on a variety of factors, however, the usage pattern of end users may vary, for example, from a few megabytes to multi-gigabytes. If all end users are treated equally during resource allocation, sub-optimal utilization of network resources may result, especially with network functions directly involved in user data processing (e.g. user plane functions or "UPF s").

For example, allocation of a low data usage subscriber to an underutilized UPF, or allocation of multiple "data-greedy" users to the same UPF, may result in inefficient UPF resource utilization or congestion that impacts the QoS of all subscribers of the UPF. In a 5G network, current mechanisms available to mitigate such sub-optimal utilization of UPFs are reactive and may disrupt a user session.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4B is an illustrative representation of a more specific example of a set of session-related parameters, shown as part of a Charging Data Record "CDR" sample, associated with a packet data session for a UE according to some implementations of the present disclosure;

FIG. 9 is a set of data (e.g. historical usage data) derived CDRs associated with a UE, for use in calculating one or more predicted load contribution factors associated with a packet data session to be established for the UE;

FIG. 10 is an example multiple linear regression (MLR) model for use in predicting "duration" of a packet data session to be established for a UE;

FIG. 12 is an example of an MLR model for use in predicting "average bit rate" of a packet data session to be established for a UE;

DESCRIPTION OF EXAMPLE EMBODIMENTS

Figure 1A:
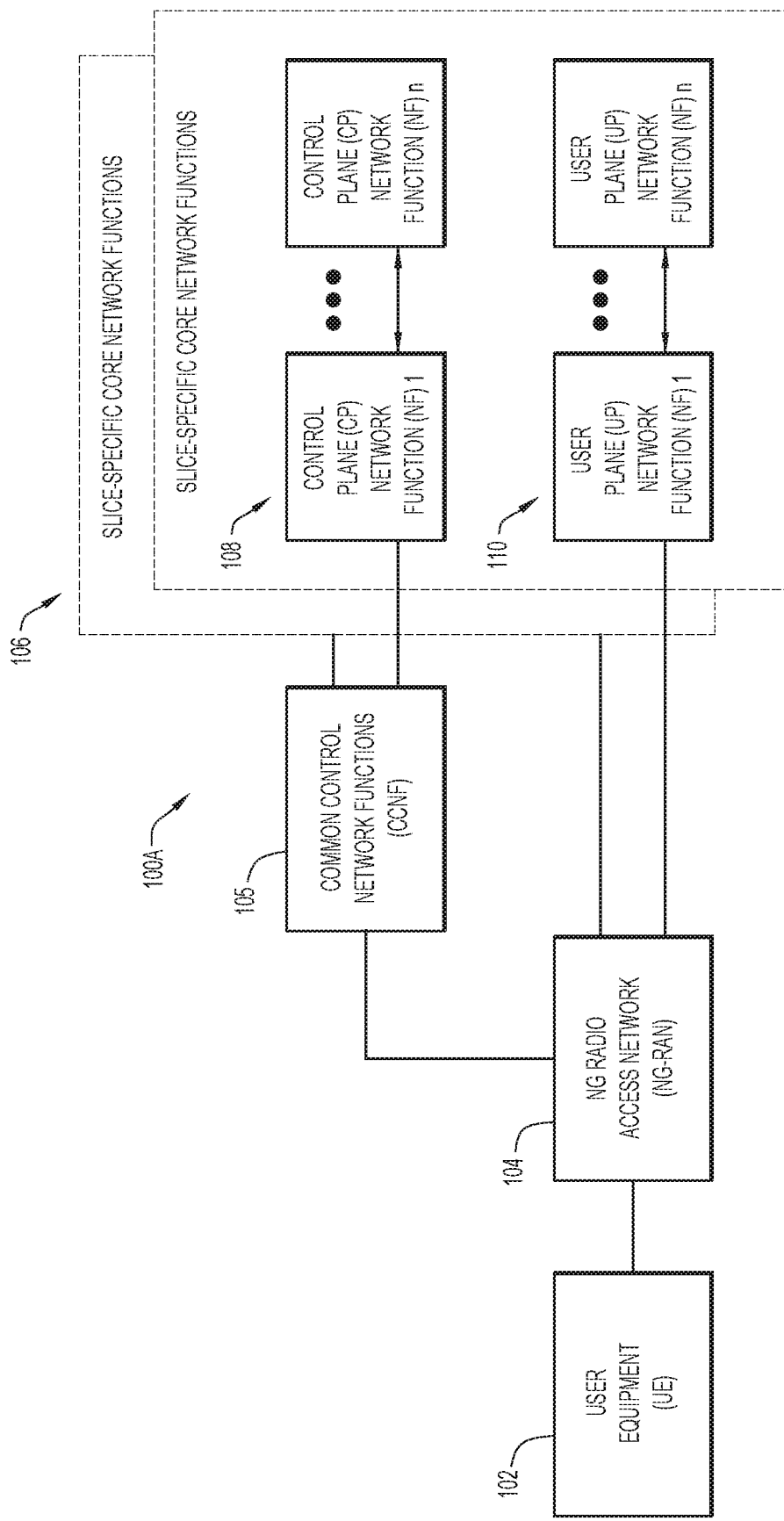
FIG. 1A is an illustrative representation of a general network architecture of a mobile network which is a Fifth Generation (5G) network.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms for use in selecting a user plane function (UPF) instance for a packet data session for a user equipment (UE) based on predicted load information are described herein.

In one illustrative example, a network node having a control plane entity for session management (e.g. a session management function or "SMF") may receive a message indicating a request for creating a packet data session for a UE. The message may be for creating a packet data session which is a Packet Data Unit (PDU) session. The network node may perform a comparative assessment of load information factors from different sets of load information factors associated with a plurality of user plane function instances. Each set of load information factors of a user plane function instance may include one or more predicted load information factors indicative of a predicted load at the user plane function instance. The network node may select one of the plurality of user plane function instances for the packet data session of the UE based on the comparative assessment of the load information factors including the one or more predicted load information factors. The selected user plane function instance may carry user plane traffic for the packet data session of the UE.

In some implementations, each predicted load information factor of a user plane function instance may be generated based on a plurality of predicted load contribution factors associated with a plurality of UEs being served by the user plane function instance. Further, each predicted load contribution factor for a UE may be calculated by a data analytics function, such as a Network Data Analytics Function (NWDAF). More particularly, each predicted load contribution factor may be calculated according to a model derived based on historical usage data from previous sessions of one or more UEs (e.g. previous sessions associated with the UE). In some preferred implementations, the historical usage data may be obtained from or derived based on data from Charging Data Records (CDRs) associated with previous sessions of one or more UEs (e.g. previous sessions associated with the UE). The data analytics function may input session-related parameters of the packet data session to be established for the UE into the model for calculating the one or more predicted load contribution factors.

In some implementations, each set of load information factors of a user plane function instance may further include one or more current load information factors indicative of a current load or available capacity of the user plane function instance. Here, the network node may select one of the plurality of user plane function instances for the packet data session of the UE based on the comparative assessment of the load information factors including the one or more predicted load information factors as well as the one or more current load information factors.

Also in some implementations, the network node may further receive a message including one or more predicted load contribution factors indicative of a predicted load contribution associated with a packet data session to be established for the UE. Here, the network node may select one of the plurality of user plane function instances for the packet data session of the UE based on the comparative assessment of the load information factors which include the one or more predicted load information factors, as well as the one or more predicted load contribution factors indicative of the predicted load contribution of the UE.

In some implementations, the one or more predicted load information factors comprise one or more of a predicted throughput at the user plane function instance, a predicted central processing unit (CPU) utilization at the user plane function instance, a predicted memory utilization at the user plane function instance, a predicted number of sessions at the user plane function instance, and a predicted number of requests to be served at the user plane function instance.

Even further implementations, each set of load information factors which includes the one or more predicted load information factors may further include a duration or time slot associated with at least one of the predicted load information factors. In alternative implementations, each set of load information factors including the one or more predicted load information factors may be associated with an implicit duration or time slot associated with at least one of the predicted load information factors.

In another illustrative example, a network node operative as a control plane entity for session management (e.g. an SMF) may perform a message exchange procedure for each one of a plurality of user plane function instances. In the message exchange procedure, the network node may send to a user plane function instance a message indicating a heartbeat request. The network node may receive from the user plane function instance a message indicating a heartbeat response. The heartbeat response may include one or more predicted load information factors of the user plane function instance. The network node may store the one or more predicted load information factors in association with an identifier of the user plane function instance. The heartbeat response may further include one or more current load information factors of the user plane function instance for storing in association with the identifier of the user plane function instance. The message exchange procedure which includes the sending, the receiving, and the storing may be regularly repeated for each one of the plurality of user plane function instances.

In yet another illustrative example, a network node operative as a control plane entity for session management (e.g. an SMF) may send to a data analytics function (e.g. a NWDAF) a message indicating a request for one or more predicted load contribution factors associated with the UE. The request may include one or more session-related parameters of a packet data session to be established for the UE. The network node may receive from the data analytics function a message including the one or more predicted load contribution factors associated with the UE. The one or more predicted load contribution factors may be indicative of a predicted load contribution of the UE at the user plane function instance. In some implementations, the network node may select one of the plurality of user plane function instances for the packet data session of the UE based on a comparative assessment of load information factors which include one or more predicted load information factors, and further include the one or more predicted load contribution factors indicative of the predicted load contribution of the UE.

In even another illustrative example, a network node operative as a control plane entity for session management (e.g. an SMF) may send to a selected user plane function instance a message indicating a request for establishing a control plane session for managing a packet data session for a UE. The message indicating the request for establishing the control plane session may include one or more predicted load contribution factors indicative of a predicted load contribution of the UE. In some implementations, the user plane function instance may operate to generate one or more predicted load information factors associated with the user plane function instance based on a plurality of predicted load contribution factors associated with a plurality of UEs being served by the user plane function instance. The user plane function instance may regenerate the one or more predicted load information factors to include the one or more predicted load contribution factors indicative of the predicted load contribution of the UE. Alternatively, the control plane entity may send to the user plane function instance the one or more predicted load contribution factors indicative of the predicted load contribution of the UE during the control plane session instead of during its establishment.

In yet even another example, a network node operative as a data analytics function (e.g. NWDAF) may utilize a model (or model function) to calculate one or more predicted load contribution factors indicative of the predicted load associated with the packet data session to be established for the UE. The model may be derived based on historical usage data from previous sessions of one or more UEs (e.g. previous sessions associated with the UE). In some implementations, the historical usage data may be obtained from or derived based on data from CDRs associated with previous sessions of one or more UEs (e.g. previous sessions associated with the UE). The data analytics function may input the session-related parameters of the request into the model for calculating the one or more predicted load contribution factors. In some preferred implementations, the model may be a multiple linear regression model.

Here, the network node operative as the data analytics function (e.g. a NWDAF) may receive a message indicating a request for one or more predicted load contribution factors indicative of a predicted load contribution associated with a packet data session to be established for a UE. The message may be received from a control plane entity for session management (e.g. an SMF). The request may include one or more session-related parameters of the packet data session to be established for the UE. The network node may calculate a predicted load contribution factor for the packet data session to be established for the UE, based on the model (e.g. the multiple linear regression model) which receives the session-related parameters as input. Again, the model may be derived based on historical usage data from previous sessions of one or more UEs (e.g. previous sessions associated with the UE). In some implementations, the historical usage data may be obtained from or derived based on data from CDRs associated with one or more UEs (e.g. previous sessions associated with the UE). The network node may send a message indicating a response which includes the one or more predicted load contribution factors indicative of the predicted load contribution of the packet data session to be established for the UE.

In some implementations, for a given UE, historical usage data used to derive the model may include or be derived from a plurality of usage indicator values associated with a plurality of previous sessions of the UE, and for each usage indicator value, a set of session characteristics associated with the previous session of the UE. In some alternative implementations, the historical usage data may include or be derived from a plurality of usage indicator values associated with a plurality of previous sessions of multiple UEs or applications of the same or similar type or context, and for each usage indicator value, a set of session characteristics of the previous sessions associated with the multiple UEs or applications of the same or similar type or context. A usage indicator value indicative of usage of previous session(s) may be based on an average or aggregation of usage indicator values of the same or similar type or context.

A usage indication value indicative of usage of previous session(s) may be, for example, a bitrate or data throughput, an uplink (UL) data volume value or indicator, a downlink (DL) data volume value or indicator, a Quality of Service (QoS) value or indicator, or a QoS Flow Indicator (QFI) of a previous session. Further, a usage indication value may be, or be translated to (e.g. after obtaining of an initial value), a predicted CPU utilization at the user plane function instance, a predicted memory utilization at the user plane function instance, a predicted number of sessions at the user plane function instance, and a predicted number of requests to be served at the user plane function instance. Session characteristics of a previous session may be or include a day, a time or time period of the day, a location, a session type, an access type, a Radio Access Technology (RAT) type, an application type, etc.

Again, in some implementations, the model which may be used at the data analytics function (e.g. NWDAF) may be or be based on a multiple linear regression model. That is, a multiple linear regression model may be utilized to determine a predicted load contribution associated with a packet data session to be established for a UE. The multiple linear regression model may be or be based on an expression $$y = \beta_0 + \beta_1 x_1 + \beta_2 x_2 + \ldots \beta_k x_k$$

or $$y = \beta_0 + \beta_1 x_1 + \beta_2 x_2 + \ldots \beta_k x_k + \epsilon$$

where y is a response variable y which is an output that represents the predicted load contribution value or, alternatively, a value from which the predicted load contribution value may be derived;

$\beta_1, \beta_2, \ldots \beta_k$ are regression coefficients which may derived based on the historical usage data associated with previous sessions of the UE or multiple UEs or applications of the same or similar type or context;

$x_1, x_2, \ldots x_k$ are predictor variables to which the session-related parameters associated with the packet data session to be established for the UE are input; and $\epsilon$ are residual terms of the model and distribution assumptions that may be placed on the residuals for a later inference on the remaining model parameters, for use in some implementations if and as needed.

More generally, in another illustrative example, at a control plane entity for use in a mobile network (e.g. a 5G network), a message indicating a network resource request (e.g. a request to establish a packet data session for a UE) may be received. In response, a comparative assessment of load information factors from different sets of load information factors associated with a plurality of NF instances (or network resources, such as or including controllers, servers, routers, Radio Access Network "RAN" entities, eNBs, or gNBs, etc.) may be performed. Each set of load information factors of an NF instance (or a network resource) may include one or more predicted load information factors indicative of a predicted load at the NF instance (or the network resource). One of the plurality of NF instances (or network resources) may be selected based on the comparative assessment of the load information factors which include the one or more predicted load information factors. In some implementations, one of the plurality of NF instances (or network resources) may be selected based on the comparative assessment of the load information factors which include the one or more predicted load information factors, and further include one or more predicted load contribution factors indicative of a predicted load contribution of the request to be served. The data analytics function or NWDAF may be utilize a model (e.g. a multiple linear regression model) for the calculation of predicted load contribution factors and predicted load information factors as described herein.

More detailed and alternative techniques and implementations are provided herein as described below.

Example Embodiments

In a Fifth Generation (5G) environment, there is a need for a data driven and proactive analytics-based approach to help select optimal or otherwise appropriate network functions (NFs) or other resources to service a given user equipment (UE) operating in a 5G network (e.g. selection of a User Plane Functions "UPF" instance for carrying user plane traffic for the UE).

According to at least some implementations of the present disclosure, techniques and mechanisms for UPF instance selection in a mobile network are provided. The techniques and mechanisms of the present disclosure may make use of services of a data analytics function, such as Network Data Analytics Function (NWDAF), in the mobile network. UPF allocation may be determined based on available capacity of the UPFs as well as predicted use of services by subscribers. Prediction models may be trained on various features, including historical usage data from data derived from Charging Data Records (CDRs) data, and/or statistical data derived from one or more applications, locations, and user subscriptions. Dynamic current load information, which may be communicated by the UPF to a Session Management Function (SMF), may be enhanced to provide predicted load information associated with the UPF. UPF selection may be based on multiple parameters including dynamic current load information which is communicated by a UPF to the SMF over an N4 interface, enhanced to provide an expected or predicted load on the UPF. The predicted load on the UPF may be calculated based on a predicted load contribution of usage for each one of a plurality of UEs or subscribers that are served by the UPF.

To better explain, FIG. 1A is an illustrative representation of a general network architecture 100A of a 5G network. Network architecture 100A includes common control network functions (CCNF) 105 and a plurality of slice-specific core network functions 106. With network architecture 100A, the 5G network may be configured to facilitate communications for a UE 102. UE 102 may obtain access to the 5G network via a radio access network (RAN) or a Next Generation (NG) RAN (NG-RAN) 104. NG-RAN 104 may include one or more base stations or gNodeBs (gNBs), such as a gNB 107. UE 102 may be any suitable type of device, such as a cellular telephone, a smart phone, a tablet device, an Internet of Things (IoT) device, a Machine-to-Machine (M2M) device, and a sensor, to name but a few.

Network architecture 100A of the 5G network includes a Service-Based Architecture (SBA) which may provide a modular framework from which common applications can be deployed using components of varying sources and suppliers. The SBA of the 5G network may be configured such that control plane functionality and common data repositories are provided by way of a set of interconnected Network Functions (NFs), each with authorization to access each other's services.

Accordingly, CCNF 105 includes a plurality of NFs which commonly support all sessions for UE 102. UE 102 may be connected to and served by a single CCNF 105 at a time, although multiple sessions of UE 102 may be served by different slice-specific core network functions 106. CCNF 105 may include, for example, an Access and Mobility Management Function (AMF) and a Network Slice Selection Function (NSSF). UE-level mobility management, authentication, and network slice instance selection are examples of functionalities provided by CCNF 105.

On the other hand, slice-specific core network functions 106 of the network slices may be separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, an SMF, whereas UP NFs 110 may include, for example, a UPF.

Figure 1B:
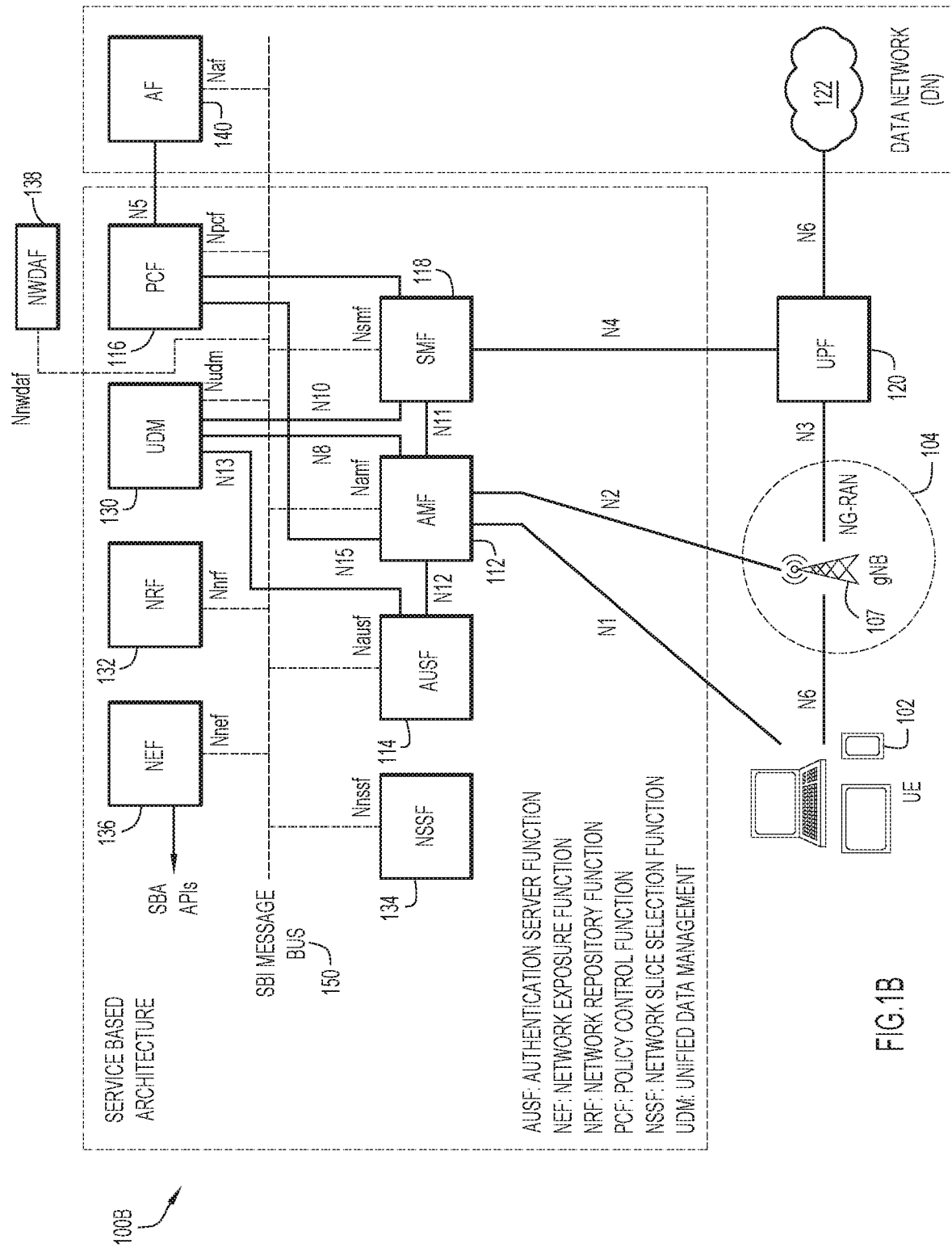
FIG. 1B is an illustrative representation of a more detailed network architecture of the 5G network of FIG. 1A.

FIG. 1B is an illustrative representation of a more detailed network architecture 100B of the 5G network of FIG. 1A. As provided in Third Generation Partnership Project (3GPP) standards for 5G (e.g. 3GPP Technical Specifications or "TS" 23.501 and 23.502), network architecture 100B for the 5G network may include an AMF 112, an Authentication Server Function (AUSF) 114, a Policy Control Function (PCF) 116, an SMF 118, and a UPF 120 which may connect to a Data Network (DN) 122. Other NFs in the 5G network include an NSSF 134, a network exposure function (NEF) 136, an NF repository function (NRF) 132, and a Unified Data Management (UDM) function 130. A plurality of interfaces and/or reference points N1-N8, N10-N13, and N15 shown in FIG. 1B (as well as others) may define the communications and/or protocols between each of the entities, as described in the relevant (evolving) standards documents.

In FIG. 1B, UPF 120 is part of the user plane and all other NFs (i.e. AMF 112, AUSF 114, PCF 116, SMF 118, and UDM 130) are part of the control plane. Separation of user and control planes guarantees that each plane resource may be scaled independently. It also allows UPFs to be deployed separately from CP functions in a distributed fashion. The NFs in the CP are modularized functions; for example, AMF 112 and SMF 118 may be independent functions allowing for independent evolution and scaling.

The SBA of the 5G network is better illustrated in FIG. 1B, again whereby the control plane functionality and common data repositories are provided by way of the set of interconnected NFs, each with authorization to access each other's services. Assuming the role of either service consumer or service producer, NFs may be self-contained, independent and reusable. With the SBA, each NF service may expose its functionality through a Service Based Interface (SBI) message bus 150. SBI message bus 150 may employ a Representational State Transfer (REST) interface (e.g. using Hypertext Transfer Protocol or "HTTP"/2). As indicated in FIG. 1B, the SBI interfaces of SBI message bus 150 may include an Namf for AMF 112, an Nausf for AUSF 114, an Npcf for PCF 116, an Nsmf for SMF 118, an Nudm for UDM 130, an Nnrf for NRF 132, an Nnssf for NSSF 134, an Nnef for NEF 136, and an Naf for AF 140.

Network slicing brings a high degree of deployment flexibility and efficient resource utilization when deploying diverse network services and applications. NSSF 134 may facilitate network slicing in the 5G network, as it operates to select network slice instances (NSIs) for UEs. A logical, end-to-end network slice may have predetermined capabilities, traffic characteristics, and service level agreements (SLAs), and may include the virtualized resources required to service the needs of a Mobile Virtual Network Operator (MVNO) or group of subscribers, including a dedicated UPF 120, SMF 118, and PCF 116. In some implementations, the techniques and mechanisms are utilized in a network slice configured to support an Enhanced Mobile Broadband (eMBB) for bringing a guaranteed ultra-high-speed mobile broadband for sub scribers.

UDM 130 may provide services to SBA functions, such as AMF 112, SMF 118 and NEF 136. UDM 130 is typically recognized as a stateful message store, holding information in its local memory. Alternatively, UDM 130 may be stateless, storing information externally within a Unified Data Repository (UDR). UDM 130 may be considered to be analogous to a Home Subscriber Server (HSS), providing authentication credentials while being employed by AMF 112 and SMF 118 to retrieve subscriber data and context.

One or more application functions, such as an Application Function (AF) 140 may connect to the 5G network, for example, via PCF 116. AF 140 may interact with the network via NEF 136 in order to access network capabilities. NEF 136 may securely expose network capabilities and events provided by NFs to AF 140, and may provide a means for AF 140 to securely provide information to the 5G network.

In general, NRF 132 may maintain NF profiles of available NF instances and their associated services, and support a service discovery function for service discovery associated with the NF profiles. NF profiles of NF instances maintained in NRF 132 may include NF instance ID, NF type (e.g. AMF, SMF, PCR, UPF, etc.), network slice identifiers such as NSI ID, NF capacity information, names of supported services, etc. For service discovery, NRF 132 may receive a discovery request from an NF instance and provide information associated with the discovered NF instance to the NF instance in response.

Also as indicated in FIG. 1B, a data analytics function such as a NWDAF 138 may be provided in the 5G network. Services and interfaces of NWDAF 138 is described in 3GPP TS 29.520. See also 3GPP TS 23.288. NWDAF 138 may be used for data collection and data analytics in a centralized manner, with use of an $N_{nwdaf}$ interface on the SBI message bus. NWDAF 138 may receive activity data and (local) analytics from NFs, AFs, or Apps, and/or access data from one or more data repositories or data stores. Resulting analytics may be generated and sent or otherwise provided by NWDAF 138 to the NFs, AFs, or Apps. Other data analytics functions may be provided in the 5G network or RAN. In some implementations, the NWDAF 138 or data analytics function may provide analytics data to NRF 132 in association with functions of the 5G network for discovery and use by other NFs.

Traditional UPF selection is defined in 3GPP TS 23.502 which provides an option for a UPF to send current load information to an SMF (e.g. allowing it to adaptively balance the session load across UPFs). Current load information of the UPF may be "piggybacked" in Packet Forwarding Control Protocol (PFCP) response messages, so that the communication of the current load information does not warrant additional message exchanges. Amongst other information, this "dynamic" current load information is one of the predominant UPF selection criteria considered by an SMF to avoid overload scenarios and to ensure acceptable user experiences. Per 3GPP TS 29.244, v16.0.0, computation of the current load is implementation-specific.

Figure 2:
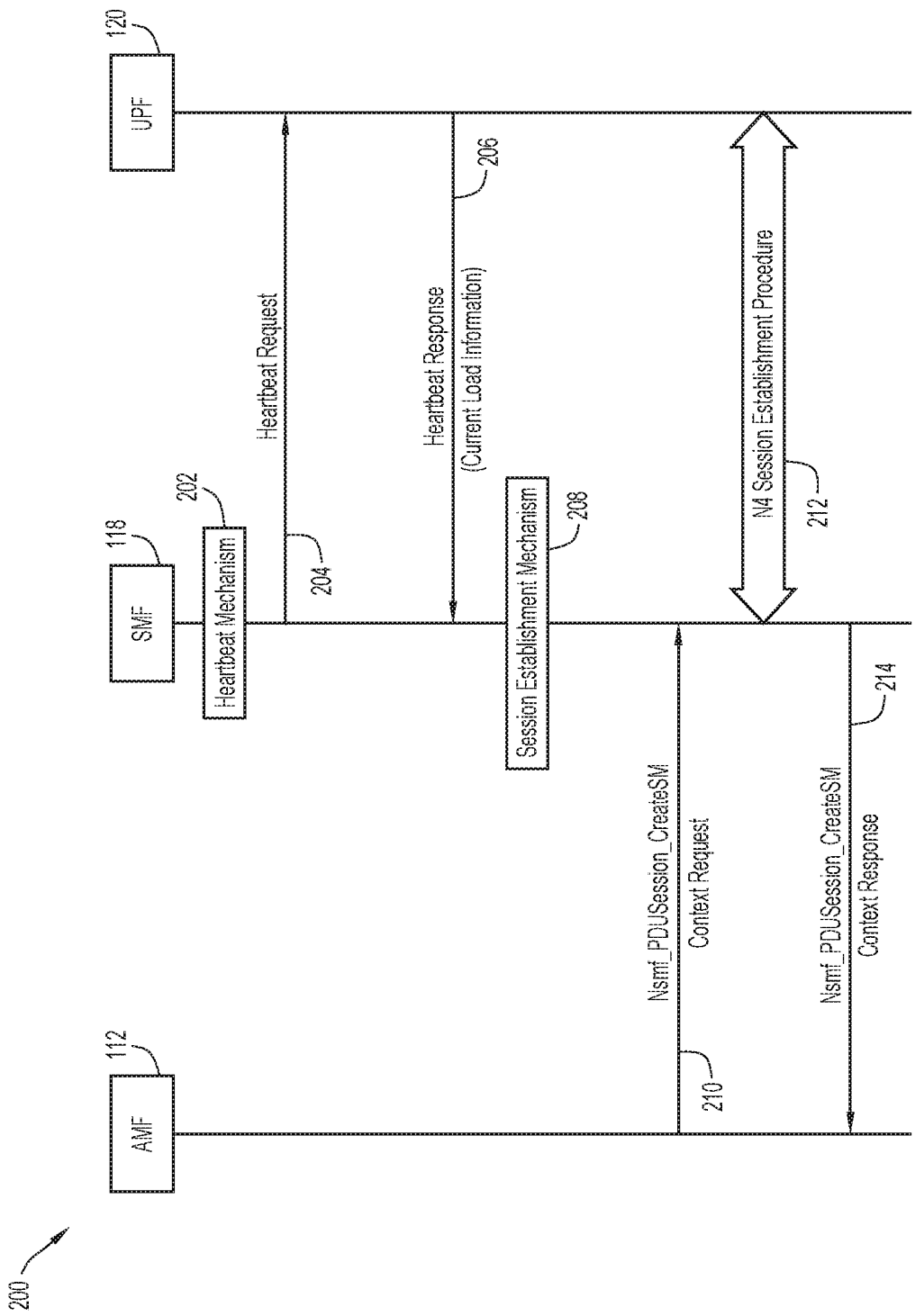
FIG. 2 is a message flow diagram for describing a method for use in selecting a user plane function (UPF) instance in a mobile network for a packet data session for a UE.

FIG. 2 is a message flow diagram 200 for describing a method for use in selecting a UPF instance for a packet data session for a UE. SMF 118 may have one or more control plane signaling sessions established with one or more UPFs instances, such as UPF 120. The control plane signaling sessions may be PFCP sessions. SMF 118 may be configured to utilize a heartbeat procedure or mechanism 202 with each one of its peers (i.e. a simple, regularly repeated request and response transaction), generally in order to determine whether each peer is still alive. SMF 118 may send to UPF 120 a message indicating a heartbeat request (step 204 of FIG. 2) and, in response, receive from UPF 120 a message indicating a heartbeat response (step 206 of FIG. 2). The message indicating the heartbeat response may include current load information of UPF 120. The current load information may be stored and utilized by SMF 118 in its UPF selection procedure.

SMF 118 may be further configured to utilize a session establishment procedure or mechanism 208 for establishing packet data sessions for UEs. In response to a request from a UE, AMF 112 may send to SMF 118 a message indicating a Packet Data Unit (PDU) establishment request for a PDU session for the UE (step 210 of FIG. 2). The message or request may be or include a request for creating a session management context. More specifically, the request may be an Nsmf_PDUSession_CreateSMContextRequest. In response, SMF 118 may select one of a plurality of UPF instance for the PDU for the UE. The selection of the UPF instance may take into consideration the current load information received in the message indicating the heartbeat response, as previously described in relation to step 206 of FIG. 2. Here, SMF 118 may select UPF 120 for the PDU session. SMF 118 may perform an N4 session establishment procedure with the selected UPF 120 (step 212 of FIG. 2). Here, SMF 118 may manage the PDU session via the N4 session. When the N4 session establishment procedure is completed, SMF 118 may send to AMF 112 a message indicating a PDU establishment response for the PDU session for the UE (step 214 of FIG. 2).

According to some implementations of the present disclosure, an additional message exchange between SMF 118 and NWDAF 138 may be provided: (1) an NWDAF analytics information request or "Nwdaf_AnalyticInfo_Request"; and (2) an NWDAF analytics information response or "Nwdaf_AnalyticInfo_Response." Here, SMF 118 may optionally request and receive predicted load information for a UPF. Such a solution may enhance UPF selection by including a predicted load contribution for the packet data session of the UE with the predicted load of the UPF into the selection criteria. Such an expected load of the subscriber and session on the UPF may be calculated by the NWDAF and communicated to the SMF, and communicated by the SMF to the UPF (e.g. during a session establishment procedure, or shortly thereafter, during the session). The UPF may keep track of the expected load for all the subscribers and provide the expected load to the SMF along with the current load. During PDU session establishment, the SMF may select an optimal UPF based on the predicted load and the subscriber's expected load (i.e. predicted load contribution) on the UPF.

A predicted load at a UPF may be said to be an estimate of the actual load at the UPF over a period of time based on historical usage data, according to a plurality of predicted load contributions of a plurality of UEs being served by the UPF, in contrast to an actual measured load (i.e. a current load) of the UPF at any given point in time. A predicted load contribution for a packet data session to be established for a UE may be said to be an estimate of the actual load of the packet data session at the UPF over a period of time based on historical usage data, in contrast to an actual measured load contribution (i.e. a current load contribution) for the packet data session at the UPF at any given point in time.

Figure 3:
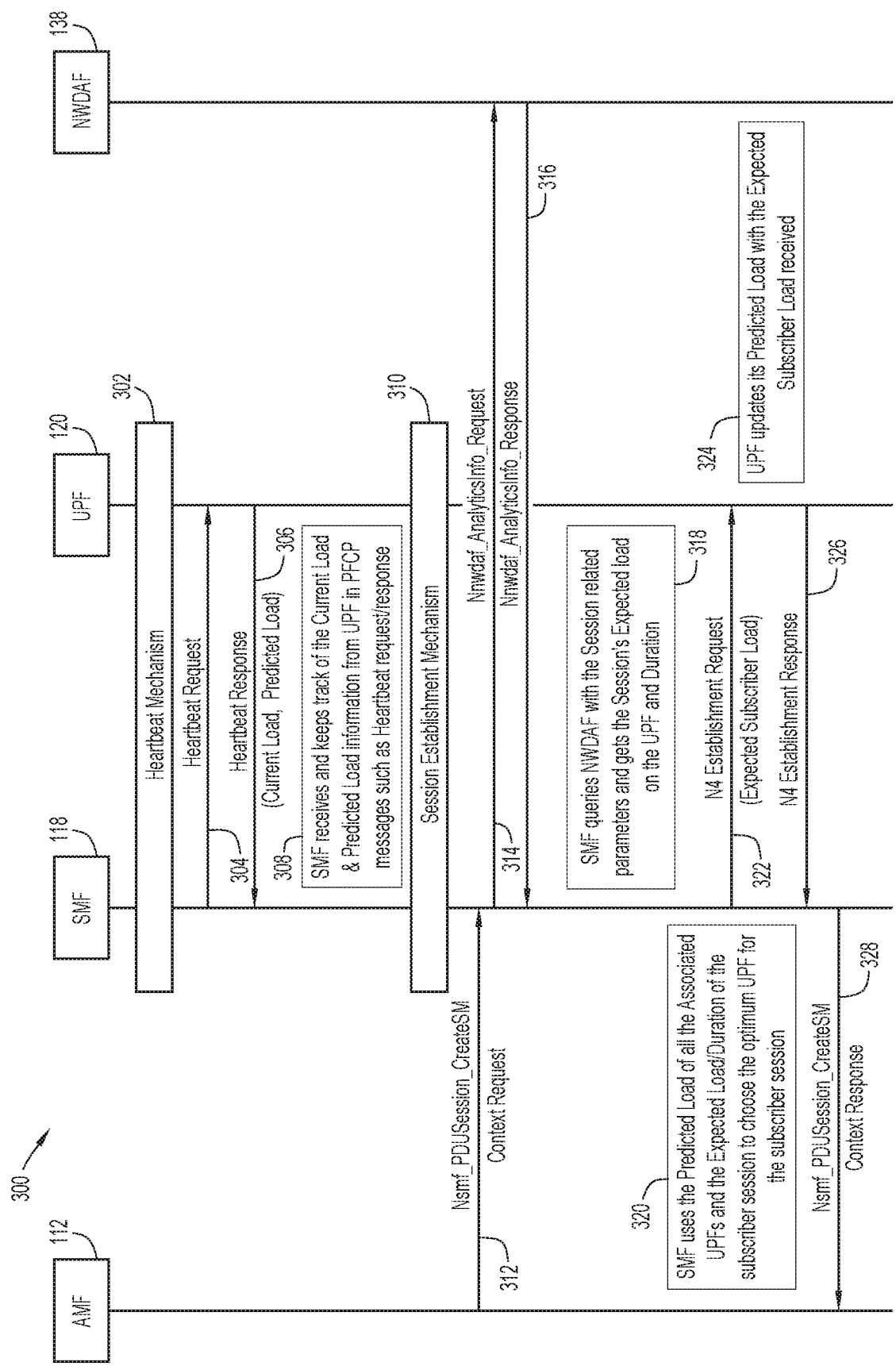
FIG. 3 is a message flow diagram for describing a method for use in selecting a UPF instance in a mobile network for a packet data session for a UE according to some implementations of the present disclosure.

FIG. 3 is a message flow diagram 300 for describing a method for use in selecting a UPF instance for a packet data session for a UE according to some implementations of the present disclosure. SMF 118 may have one or more control plane signaling sessions established with one or more UPFs instances, such as UPF 120. The control plane signaling sessions may be PCFP sessions. SMF 118 may be configured to utilize a heartbeat procedure or mechanism 302 with each one of its peers (i.e. a simple, regularly repeated request and response transaction), generally in order to determine whether each peer is still alive. The messages exchanged in the heartbeat procedure may be PFCP messages. Here, SMF 118 may send to UPF 120 a message indicating a heartbeat request (step 304 of FIG. 3) and, in response, receive from UPF 120 a message indicating a heartbeat response (step 306 of FIG. 3). The message indicating the heartbeat response may include current load information of UPF 120. In addition, the message indicating the heartbeat response may include predicted load information of UPF 120. The current load information and the predicted load information may be stored at SMF 118. For example, the current load information and the predicted load information may be stored at SMF 118 in association with an identifier of the UPF (e.g. an instance ID or a session identifier). As is apparent, SMF 118 may receive and keep track of current load information and predicted load information from UPF 120 in PCFP messages (step 308 of FIG. 3).

SMF 118 may be further configured to utilize a session establishment procedure or mechanism 310 for establishing packet data sessions for UEs. In response to a request from a UE, AMF 112 may send to SMF 118 a message indicating a PDU establishment request for a packet data session (e.g. a PDU session) for the UE (step 312 of FIG. 3). The message or request may be or include a request for creating a session management context. More specifically, the request may be an Nsmf_PDUSession_CreateSMContextRequest.

In response, SMF 118 may send to NWDAF 138 a message indicating a request for one or more predicted load contribution factors associated with the packet data session to be established for the UE (step 314 of FIG. 3). In some implementations, the request may be or be referred to as an NWDAF analytics information request or "Nwdaf_AnalyticInfo_Request." The request may include one or more session-related parameters of the packet data session to be established for the UE. SMF 118 may receive from NWDAF 138 a message indicating a response including the one or more predicted load contribution factors (step 316 of FIG. 3). In some implementations, the response may be or be referred to as an NWDAF analytics information response or "Nwdaf_AnalyticInfo_Response." The one or more predicted load contribution factors may be indicative of a predicted load contribution associated with the packet data session to be established for the UE (e.g. the predicted load contribution on the UPF instance be selected).

The one or more predicted load contribution factors associated with the packet data session to be established for the UE may generated or calculated by NWDAF 138 based on a model (or model function) at NWDAF 138 which receives the session-related parameters as input to the model. The model at NWDAF 138 may be derived based on historical usage data from previous packet data sessions associated with one or more UEs (e.g. previous packet data sessions of the UE). In some implementations, the historical usage data may be obtained from or derived based on data from CDRs of previous packet data sessions associated with one or more UEs (e.g. previous packet data sessions of the UE). Thus, SMF 118 queries NWDAF 138 with the session-related parameters to obtain the predicted load contribution of the packet data session to be established for the UE (step 318 of FIG. 3).

For selecting a UPF instance for the packet data session for the UE, SMF 118 may perform a comparative assessment of load information factors from different sets of load information factors associated with the UPF instances. Each set of load information factors of a UPF instance may include one or more current load information factors and one or more predicted load information factors. In preferred implementations, the comparative assessment may include the one or more current load information factors, the one or more predicted load information factors, and further include the one or more predicted load contribution factors indicative of the predicted load contribution for the packet data session to be established for the UE (step 320 of FIG. 3). In the present case, SMF 118 may select UPF 120 for the packet data session for the UE.

SMF 118 may perform an N4 session establishment procedure with the selected UPF 120 for establishing an N4 session to manage the packet data session. Here, SMF 118 may send to UPF 120 a message indicating a request for establishing a control plane session for managing the packet data session for the UE (step 322 of FIG. 3); this request may be an N4 establishment request. SMF 118 may receive from UPF 120 a message indicating a response to the request; this response may be an N4 establishment response (step 326 of FIG. 3).

The message indicating the request for establishing the control plane session in step 322 may include the one or more predicted load contribution factors indicative of the predicted load contribution of the packet data session to be established for the UE. UPF 120 may maintain storage of and track its predicted load, which may be characterized by one or more predicted load information factors which it generates based on a plurality of predicted load contribution factors associated with a plurality of UEs currently being served by UPF 120. UPF 120 may update its predicted load by regenerating (e.g. updating) the one or more predicted load information factors taking into consideration the received predicted load contribution factors indicative of the predicted load contribution of the packet data session to be established for the UE (step 324 of FIG. 3). When the N4 session establishment procedure is completed, SMF 118 may send to AMF 112 a message indicating a PDU establishment response for the PDU session for the UE (step 328 of FIG. 3).

Figure 4A:
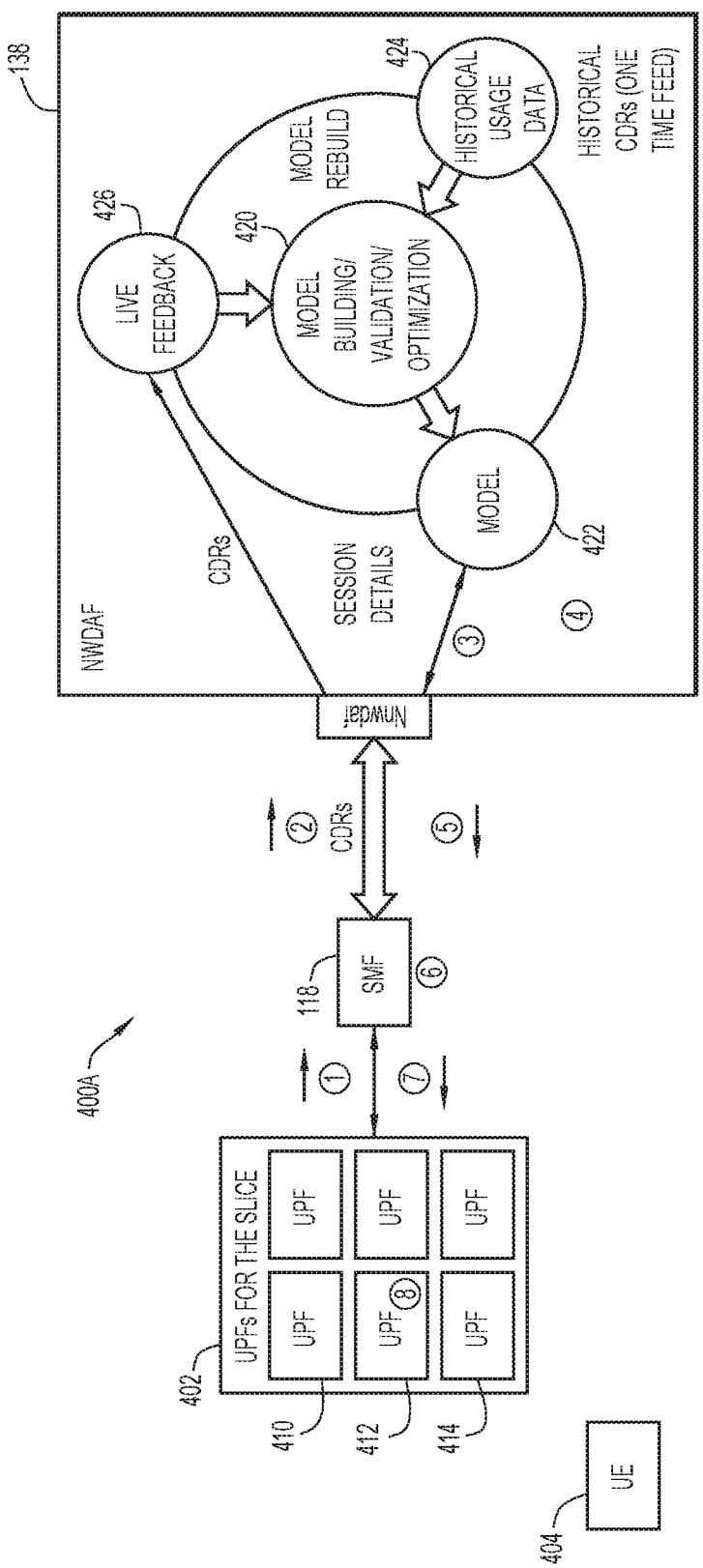
FIG. 4A is an illustrative representation of a select network nodes of a network architecture of a mobile network according to some implementations, further illustrating a message flow for describing UPF selection according to some implementations of the present disclosure.

FIG. 4A is an illustrative representation of a select network nodes of a network architecture 400A of a mobile network according to some implementations. Network architecture 400A is provided with a message flow for describing UPF selection according to some implementations of the present disclosure. Network architecture 400A of FIG. 4A includes SMF 118, a plurality of UPF instances 402 of a network slice, and NWDAF 138. The plurality of UPF instances 402 are shown to include at least UPF instances 410, 412, and 414.

In general, SMF 118 may operate to select one of the plurality of UPF instances 402 (e.g. UPF instance 412) for a packet data session of a UE 404 based on predicted load information of the UPF instances 402. In some implementations, SMF 118 may operate to select one of the plurality of UPF instances 402 for the packet data session to be established for UE 404 based on current load information and predicted load information of UPF instances 402. In preferred implementations, more specifically, SMF 118 may operate to select one of the plurality of UPF instances 402 based on current load information, predicted load information, and a predicted load contribution associated with the packet data session to be established for UE 404.

Predicted load information, which may be based on predicted load contributions associated with a plurality of UEs, may be generated with use of NWDAF 138. In some implementations as shown in FIG. 4A, NWDAF 138 may include a model 422 (or model function) for calculating one or more predicted load contribution factors indicative of a predicted load contribution (e.g. on a UPF or UPF instance) associated with a UE. In some implementations, model 422 may be configured for calculating one or more predicted load contribution factors indicative of a predicted load contribution associated with a packet data session to be established for a UE based on one or more session-related parameters of the packet data session to be established for the UE.

NWDAF 138 may further include a model building process 420 for building model 422. In particular, historical usage data 424 may be input to model building process 420 for building model 422. In some implementations, historical usage data 424 may be generated based on data from CDRs of previous sessions associated with one or more UEs (e.g. previous sessions associated with UE 404). For a given UE, the CDRs associated with the UE record the historical usage of the UE (e.g. summaries and/or details of its previous packet data sessions). Further, (live or current) feedback data 426 may be input to model building process 420 for (regularly) rebuilding model 422. Feedback data 426 may be based on (live or current) CDRs received as a result of (live or current) data sessions of the UEs. Model building process 420 may further include a model validation process for validating model 422 based on feedback data 426. Further, model building process 420 may include a model optimization process for rebuilding model 422 based on feedback data 426.

Again, NWDAF 138 may utilize model 422 to calculate the one or more predicted load contribution factors indicative of the predicted load associated with the packet data session to be established for the UE. Model 422 may be derived based on historical usage data 424 from previous sessions of one or more UEs (e.g. previous sessions associated with UE 404). In some implementations, the historical usage data 424 may be obtained from or derived based on data from CDRs associated with previous sessions of one or more UEs (e.g. previous sessions associated with UE 404). NWDAF 138 may input the session-related parameters of the request into model 422 for calculating the one or more predicted load contribution factors.

In some implementations, for a given UE 404, historical usage data 424 used to derive model 422 may include or be derived from a plurality of usage indicator values associated with a plurality of previous sessions of UE 404, and for each usage indicator value, a set of session characteristics associated with the previous session of UE 404. Also in some implementations, historical usage data 424 may include or be derived from a plurality of usage indicator values associated with a plurality of previous sessions of multiple UEs or applications of the same or similar type or context, and for each usage indicator value, a set of session characteristics of the previous sessions associated with the multiple UEs or applications of the same or similar type or context. A usage indicator value indicative of usage of previous session(s) may be based on a single or multiple values or be an average or aggregation of usage indicator values associated with the same or similar type or context of multiple UEs or applications.

A usage indication value indicative of usage of previous session(s) may be, for example, a bitrate or data throughput, an UL data volume value or indicator, a DL data volume value or indicator, a QoS value or indicator, or a QFI of a previous session. Further, a usage indication value may be, or be translated to (e.g. after obtaining of an initial value), a predicted central processing unit (CPU) utilization at the user plane function instance, a predicted memory utilization at the user plane function instance, a predicted number of sessions at the user plane function instance, and a predicted number of requests to be served at the user plane function instance. Session characteristics of a previous session may be or include a day, a time or time period of the day, a location, a session type, an access type, a RAT type, an application type, etc.

In some implementations, model 422 may be or be based on a multiple linear regression model. That is, a multiple linear regression model may be utilized to determine a predicted load contribution associated with a packet data session to be established for a UE. The multiple linear regression model may be or be based on an expression $$y = \beta_0 + \beta_1 x_1 + \beta_2 x_2 + \ldots \beta_k x_k$$

or $$y = \beta_0 + \beta_1 x_1 + \beta_2 x_2 + \ldots \beta_k x_k + \epsilon$$

or where y is a response variable, $\beta_1, \beta_2, \ldots \beta_k$ are regression coefficients, and $x_1, x_2, \ldots x_k$ are predictor variables. In some implementations of the present disclosure, the response variable y is an output that represents the predicted load contribution value or, alternatively, a value from which the predicted load contribution value may be derived; the regression coefficients $\beta_1, \beta_2, \ldots \beta_k$ are coefficients which may derived based on the historical usage data associated with previous sessions of the UE or the multiple UEs or applications of the same or similar type or context; and the predictor variables $x_1, x_2, \ldots x_k$ are variables to which the session-related parameters associated with the packet data session to be established for the UE are input. For use in some implementations if and as needed, the $\epsilon$ are residual terms of the model and distribution assumptions that may be placed on the residuals for a later inference on the remaining model parameters.

Again with reference to FIG. 4A, predicted load information for a UPF instance may be based on (e.g. an aggregate of) predicted load contributions associated with a plurality of UEs being served by the UPF instance. Each one of the UPF instances 402 may maintain storage of and track its own predicted load that is characterized by the predicted load information.

Beginning the message flow of FIG. 4A, each UPF instance may communicate with SMF 118 to provide its predicted load information (as well as its current load information) to SMF 118 on a regular or periodic basis (step 1 of FIG. A). Accordingly, SMF 118 may maintain storage or and track the predicted load for each one of UPF instances 402 of the network slice.

In response to a request for creating a packet data session for UE 404, SMF 118 may send to NWDAF 138 a message indicating a request for one or more predicted load contribution factors associated with UE 404 (step 2 of FIG. 4A). More particularly, the request may include session-related parameters of the packet data session to be established for UE 404, for querying NWDAF 138 to identify a predicted load contribution associated with UE 404. Session-related parameters of the packet data session to be established may include, for example, one or more identifiers associated with UE 404, a location of UE 404, a device type of UE 404, a rulebase name associated with UE 404, a QFI, a throttling threshold (e.g. an access point name "APN"—Aggregate Maximum Bitrate "AMBR"), etc.

The session-related parameters may be received at NWDAF 138 and input into model 422 at NWDAF 138 (step 3 of FIG. 4A). One or more predicted load contribution factors associated with UE 404 may be calculated or predicted based on model 422 (step 4 of FIG. 4A). In some implementations, NWDAF 138 may input the session-related parameters into model 422 of NWDAF 138 to predict a duration and an average usage (e.g. in bits per second), and to derive a load factor from the average usage. NWDAF 138 may send to SMF 118 a message including the one or more predicted load contribution factors associated with UE 404, where the one or more predicted load contribution factors are indicative of a predicted load contribution or "expected load" at UPF instance 412 for UE 404 (step 5 of FIG. 4A). SMF 118 may receive the message including the one or more predicted load contribution factors associated with UE 404. In some implementations, SMF 118 may receive from NWDAF 138 the predicted duration, the average usage, and/or the load factor.

In general, for selecting one of UPF instances 402 for the packet data session for UE 404, SMF 118 may perform a comparative assessment of load information factors from different sets of load information factors associated with UPF instances 402 (step 6 of FIG. 4A). Each set of load information factors of a UPF instance may include one or more current load information factors and one or more predicted load information factors. In some implementations, the comparative assessment may include the one or more current load information factors and the one or more predicted load information factors, further taking into consideration the one or more predicted load contribution factors indicative of the predicted load contribution for the packet data session to be established for UE 404.

In this example, SMF 118 may select UPF instance 412 for the packet data session for UE 404 based on the comparative assessment of the load information factors. Then, SMF 118 may send to UPF instance 412 a message including the one or more predicted load contribution factors associated with the packet data session to be established for UE 404 (step 7 of FIG. 4A). UPF instance 412 may receive the message including the one or more predicted load contribution factors indicative of the predicted load contribution. As UPF instance 412 may maintain storage of and track its own predicted load, UPF instance 412 may update its predicted load information based on the one or predicted load contribution factors associated with the packet data session to be established for UE 404 (step 8 of FIG. 4A).

FIG. 4B is an illustrative representation 400B of a more specific example of a set of session-related parameters 450, shown as part of a CDR sample, of a packet data session for a UE according to some implementations of the present disclosure. At least some of session-related parameters 450 may be provided in a query request for one or more predicted load contribution factors of the packet data session for the UE. As described earlier above, a request or query request which is sent to the NWDAF may include session-related parameters of a packet data session to be established for a UE, for querying the NWDAF to identify a predicted load contribution associated with the UE.

In some implementations, a selected plurality of data items in session-related parameters 450 of FIG. 4B may be utilized according to some implementations. As shown in FIG. 4B, session-related parameters 450 related to the CDR sample may include one or more identifiers associated with the UE including one or more of a Subscriber Permanent Identifier (SUPI) (e.g. an International Mobile Subscriber Identifier "IMSI," a Generic Public Subscription Identifier (GPSI), and device information such as a Permanent Equipment Identifier (PEI). Session-related parameters 450 may include data items of a Data Network Name (DNN) and/or a Network Slice Selection Assistance Information (NSSAI) or Single NSSAI (S-NSSAI). Session-related parameters 450 may include a Packet Data Network (PDN) Type (e.g. Internet Protocol "IP" version 4 "IPv4," IP version 6 "IPv6," and/or Point-to-Point Protocol "PPP"). Session-related parameters 450 may include a time of attach, a recordOpeningTime, a causeForRecClosing, and/or charging characteristics (e.g. prepaid or postpaid). Session-related parameters 450450 may include a Radio Access Technology (RAT) Type (e.g. a 5G or New Radio "NR" type, a Wideband Evolved Universal Mobile Telecommunications System Terrestrial Radio Access Network "WB-EUTRAN" type, a Narrowband Internet of Things "NB-IoT" type, etc.). Session-related parameters 450 may include an Access Type (e.g. 3GPP type, non-3GPP type, etc.). Session-related parameters 450 may include a Time Zone of the UE and/or a UE location (e.g. a Tracking Area Identity "TAI" and/or a Cell ID "CID"). Session-related parameters 450 may include a charging policy and/or rulebase name (e.g. received from a PCF). Session-related parameters 450 may include applications accessed by the UE based on historical usage data. Session-related parameters 450 may include usage pattern and capacity available in the UPF. In preferred implementations, a data usage may be provided, and the data usage may be provided for different rating groups, such as per UL, DL, data volume, duration, QFIs of flows, etc.

Figure 5:
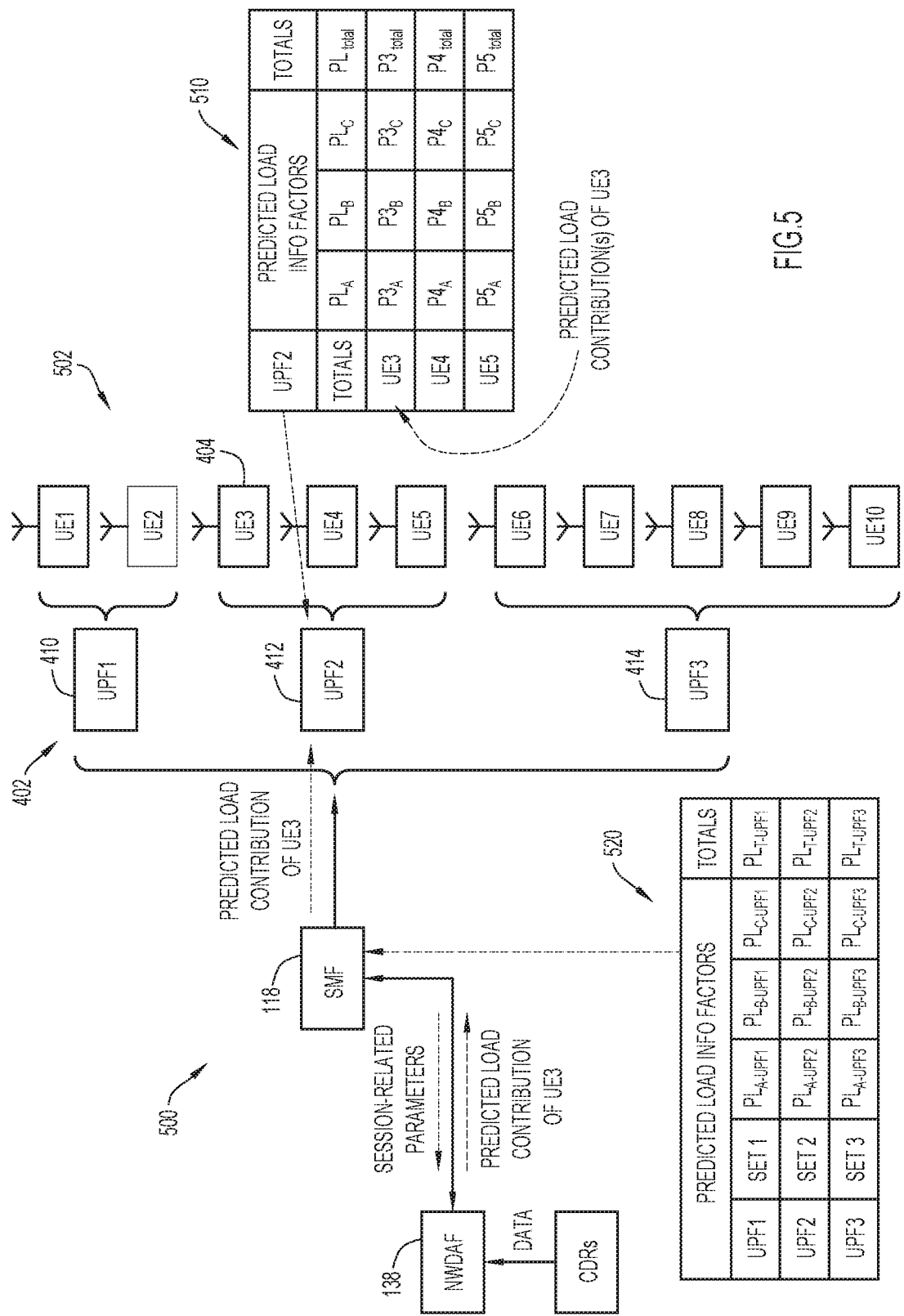
FIG. 5 is an illustrative representation of select network nodes of a mobile network for better illustrating concepts and aspects of at least some implementations of the present disclosure.

FIG. 5 is an illustrative representation of select network nodes 500 of network architecture 400A of FIG. 4A, for better describing various aspects of the present disclosure related to the operation described in relation to FIG. 4A. In FIG. 5, it is shown that the plurality of UPF instances 402 which include UPF instances 410, 412, and 414 (i.e. UPF1, UPF2, and UPF3, respectively) are currently serving a plurality of UEs 502 which include UE1 through UE10. In FIG. 5, it is shown that UPF instance 410 ("UPF1") currently serves and carries user plane traffic for UE1 and UE2; UPF instance 412 ("UPF2") currently serves and carries user plane traffic for UE3 (i.e. UE 404), UE4, and UE5; and UPF instance 414 ("UPF3") currently serves and carries user plane traffic for UE6, UE7, UE8, UE9 and UE10. Each one of UPF instances 410, 412, and 414 may maintain storage of load information factors which may include current load information factors and one or more predicted load information factors. Each predicted load information factor of a UPF instance may be calculated based on a plurality of predicted load contributions associated with a respective plurality of UEs being served by the UPF instance. Each predicted load contribution factor associated with a UE may generated by NWDAF 138 according to a model which is derived based on historical usage data of previous sessions of one or more UEs (e.g. where the historical usage data are based on data from CDRs of the previous sessions).

Consider UPF instance 412 ("UPF2") which serves and/or carries user plane traffic for UE3 (i.e. UE 404), UE4, and UE5. UPF instance 412 may track and maintain storage of a plurality of predicted load information factors indicative of its predicted load. In the illustrative example shown in FIG. 5, the predicted load of UPF instance 412 is provided in the form of a table 510 of predicted load information factors. In table 510, the predicated load information factors are represented by a total $PL_A$ (e.g. a total predicted throughput at UPF instance 412), $PL_B$ (e.g. a total predicted CPU utilization at UPF instance 412), a total $PL_C$ (e.g. a total predicted memory or buffer utilization at UPF instance 412), and a total $PL_{total}$ which corresponds to a singular summarized total of the predicted load contributions from UE3, UE4, and UE5 as indicated. UE3 has a plurality of predicted load contributions factors represented by factors $P3_A$, $P3_B$, and $P3_C$ (as well as a summarized total $P3_{total}$ for UE3); UE4 has a plurality of predicted load contribution factors represented by factors $P4_A$, $P4_B$, and $P4_C$ (as well as a summarized total $P4_{total}$ for UE4); and UE5 has a plurality of predicted load contribution factors represented by factors $P5_A$, $P5_B$, and $P5_C$ (as well as a summarized total $P5_{total}$ for UE5). At UPF instance 412, the total $PL_A$ (e.g. the total predicted throughput at UPF instance 412) is generated or calculated based on $P3_A$, $P4_A$, and $P5_A$ (e.g. predicted throughput contributions for UE3, UE4, and UE5, respectively), the total $PL_B$ is generated or calculated based on $P3_B$, $P4_B$, and $P5_B$ (e.g. predicted CPU utilization contributions for UE3, UE4, and UE5, respectively), and the total $PL_C$ is generated or calculated based on $P3_C$, $P4_C$, and $P5_C$ (e.g. predicted memory or buffer utilization contributions from UE3, UE4, and UE5, respectively). The total $PL_{total}$ is generated or calculated based on UE contributions $P3_{total}$, $P4_{total}$, and $P5_{total}$ (the singular summarized totals of UE3, UE4, and UE5, respectively).

As shown in form of a table 520 in FIG. 5, SMF 118 may maintain storage of different sets (e.g. Sets 1, 2, and 3) of load information factors associated with UPF instances 410, 412, and 414 (UPF1, UPF2, and UPF3, respectively). Each set of load information factors of a UPF instance includes one or more predicted load information factors indicative of a predicted load at the UPF instance. For example, a predicted load at UPF instance 410 ("UPF1") may be defined by a set of predicted load information factors including $PL_{A\text{-}UPF1}$, $PL_{B\text{-}UPF1}$, and $PL_{C\text{-}UPF1}$ (a total predicted throughput at UPF1, a total predicted CPU utilization at UPF1, and a total predicted memory or buffer utilization at UPF1, respectively), as well as a summarized total $PL_{T\text{-}UPF1}$. Further, a predicted load at UPF instance 412 ("UPF2") may be defined by a set of predicted load information factors including $PL_{A\text{-}UPF2}$, $PL_{B\text{-}UPF2}$, and $PL_{C\text{-}UPF2}$ (a total predicted throughput at UPF2, a total predicted CPU utilization at UPF2, and a total predicted memory or buffer utilization at UPF2, respectively), as well as a summarized total $PL_{T\text{-}UPF2}$ for UPF2. Finally, a predicted load at UPF instance 414 ("UPF3") may be defined by a set of predicted load information factors including $PL_{A\text{-}UPF3}$, $PL_{B\text{-}UPF3}$, and $PL_{C\text{-}UPF3}$ (a total predicted throughput at UPF3, a total predicted CPU utilization at UPF3, and a total predicted memory or buffer utilization at UPF3, respectively), as well as a summarized total $PL_{T\text{-}UPF3}$ for UPF3.

Figure 6:
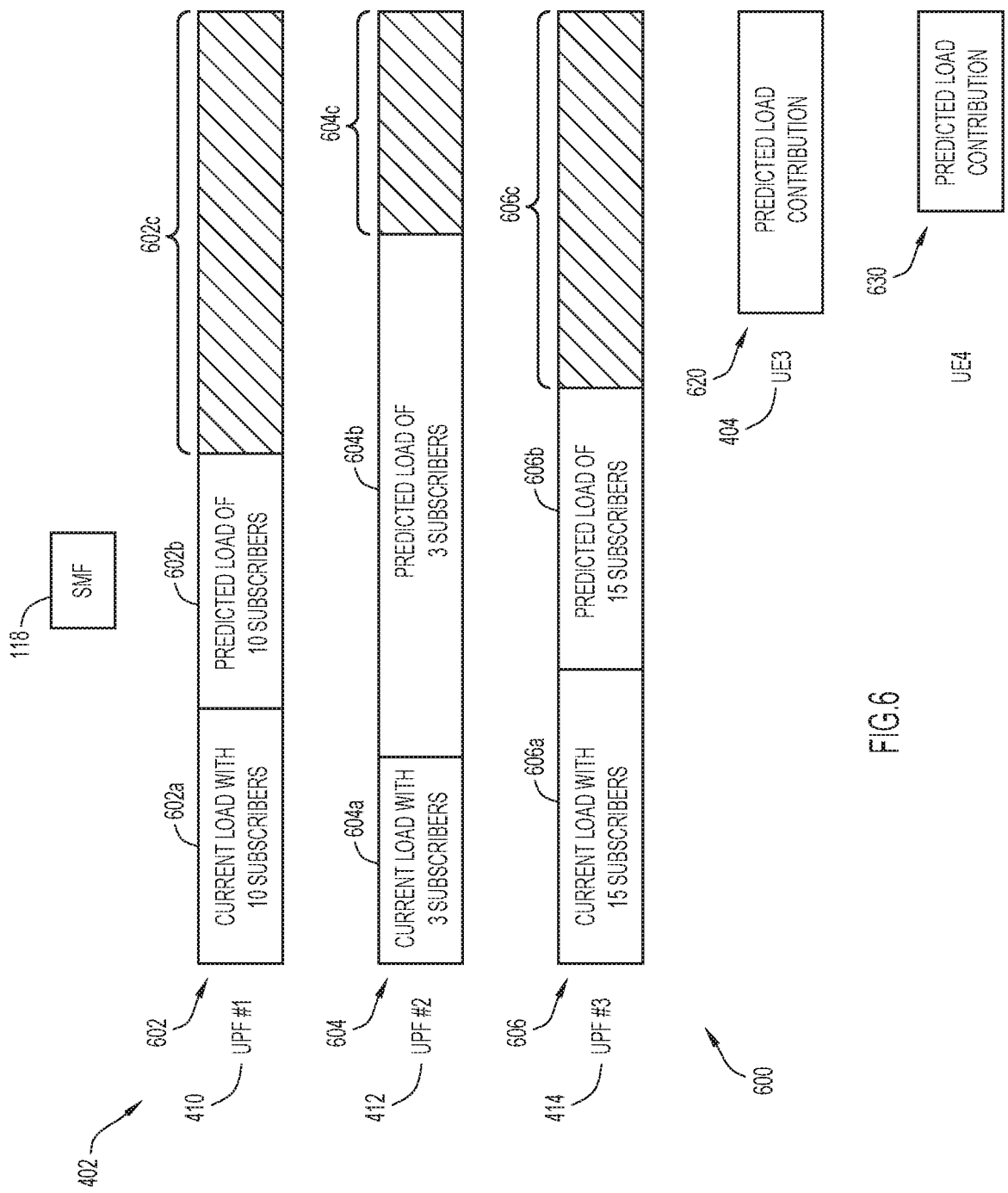
FIG. 6 is an illustrative representation of an example of current loads and predicted loads associated with a set of UPF instances according to some aspects of the present disclosure.

FIG. 6 is a basic graphical representation 600 of an example of current loads and predicted loads associated with a set of UPF instances 402 (i.e. UPF instances 410, 412, and 414 corresponding to UPF1, UPF2, and UPF3, respectively) according to some aspects of the present disclosure. As described above, SMF 118 may operate to select one of the plurality of UPF instances 402 for a packet data session to be established for a UE based on predicted load information of UPF instances 402. In some implementations, SMF 118 may operate to select one of the plurality of UPF instances 402 for the packet data session of the UE based on current load information and predicted load information of UPF instances 402. In preferred implementations, more specifically, SMF 118 may operate to select one of the plurality of UPF instances 402 for the packet data session of the UE based on current load information, predicted load information, and a predicted load contribution associated with the packet data session to be established for UE 404.

The selection of a UPF instance by SMF 118 may be based on a comparative assessment of load information factors (e.g. including the comparison of factors, such as values associated with the current, predicted, and/or predicted load contributions). In FIG. 6, the lengths of the loads in the graphical representation 600 are indicative of the relative measurements or estimates of the loads. As indicated, UPF instance 410 which serves ten (10) subscribers or UEs is indicated as having a load information 602 corresponding to a current load 602a and a predicted load 602b, as well as a resulting predicted available capacity 602c. Similarly, UPF instance 412 which serves three (3) subscribers or UEs is indicated as having a load information 604 corresponding to a current load 604a and a predicted load 604b, as well as a resulting predicted available capacity 604c. Also similarly, UPF instance 414 which serves fifteen (15) subscribers or UEs is indicated as having a load information 606 corresponding to a current load 606a and a predicted load 606b, and a resulting predicted available capacity 606c.

A request for creating a packet data session for UE3 (i.e. UE 404) may be associated with a predicted load contribution 620 indicated in FIG. 6. In response, the comparative assessment by SMF 118 may cause SMF 118 to select UPF instance 410 instead of UPF instances 412 and 414 to better accommodate the predicted needs of UE3 (e.g. compare relative measurements in FIG. 6). On the other hand, a request for creating a packet data session for UE4 may be associated with a predicted load contribution 630 indicated in FIG. 6. In response, the comparative assessment by SMF 118 may cause SMF 118 to select UPF instance 412 instead of UPF instances 410 and 414 to accommodate the predicted needs of UE4 and best distribute the loading across UPF instances 402 (e.g. compare relative measurements in FIG. 6).

Figure 7A:
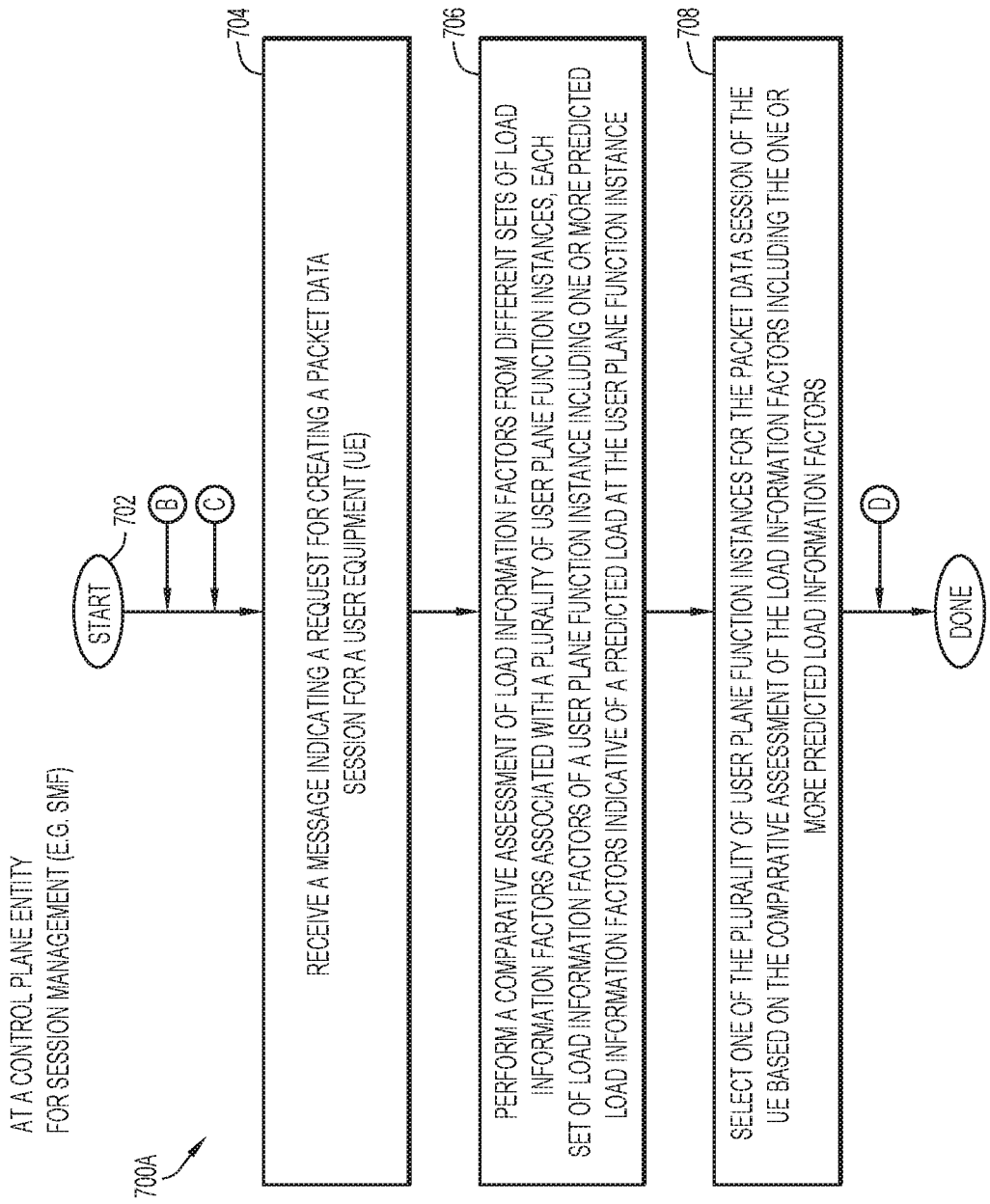
FIGS. 7A-7D are flowcharts for describing methods for use in selecting a UPF instance of a mobile network for a packet data session for a UE, which may be performed by a control plane entity for session management such as a session management function (SMF), according to some implementations of the present disclosure.

FIG. 7A is a flowchart 700A for describing a method for use in selecting a UPF instance for a packet data session for a UE according to some implementations of the present disclosure. The method may be performed by a network node operative as a control plane entity (e.g. a control plane entity for session management or an SMF) in a mobile network. The method may be embodied in a computer program product which includes a non-transitory computer readable medium and instructions stored in the non-transitory computer readable medium, where the instructions are executable by one or more processors of the network node to perform steps of the method.

Beginning at a start block 702 of FIG. 7A, the network node may receive a message indicating a request for creating a packet data session for a UE (step 704 of FIG. 7A). In some implementations, the message may be for creating a packet data session which is a PDU session (e.g. an Nsmf_P-DUSession_CreateSM Context Request). In response, the network node may perform a comparative assessment of load information factors from different sets of load information factors associated with a plurality of user plane function instances (step 706 of FIG. 7A). Each set of load information factors of a user plane function instance may include one or more predicted load information factors indicative of a predicted load at the user plane function instance. The network node may select one of the plurality of user plane function instances for the packet data session of the UE based on the comparative assessment of the load information factors which include the one or more predicted load information factors (step 708 of FIG. 7A). The selected user plane function may carry user plane traffic for the packet data session of the UE. The network node may send to the selected user plane function instance a message indicating a request for establishing a control plane session for managing the packet data session for the UE. The selected user plane function instance may be selected for carrying user plane traffic for the packet data session for the UE. The flowchart ends at a done block of FIG. 7A.

In some implementations, each predicted load information factor of a user plane function instance may be generated based on a plurality of predicted load contribution factors associated with a plurality of UEs being served by the user plane function instance. In some implementations, each predicted load contribution factor associated with a packet data session to be established for a UE may be generated by a data analytics function (e.g. an NWDAF) according to a model or model function which is derived based on historical usage data of previous sessions of one or more UEs. The model or model function may receive session-related parameters of the packet data session to be established for the UE as input. The historical usage data used to generate the model or model function may be obtained from or derived based on data from CDRs of the previous sessions.

In some implementations, each set of load information factors of a user plane function instance may further include one or more current load information factors indicative of a current load or available capacity of the user plane function instance. Here, the network node may select one of the plurality of user plane function instances for the packet data session of the UE based on the comparative assessment of the load information factors including the one or more predicted load information factors as well as the one or more current load information factors.

In some implementations, the network node may further receive a message including one or more predicted load contribution factors indicative of a predicted load contribution of the UE. Here, the network node may select one of the plurality of user plane function instances for a packet data session of the UE based on the comparative assessment of the load information factors which include the one or more predicted load information factors, as well as the one or more predicted load contribution factors indicative of the predicted load contribution of the packet data session to be established for the UE.

In some implementations, each set of load information factors which includes the one or more predicted load information factors may further include a duration or time slot associated with at least one of the predicted load information factors. In some implementations, each set of load information factors may further include the one or more predicted load information factors may be associated with an implicit duration or time slot associated with at least one of the predicted load information factors.

In some implementations, the one or more predicted load information factors comprise one or more of a predicted throughput at the user plane function instance, a predicted CPU utilization at the user plane function instance, a predicted memory utilization at the user plane function instance, a predicted number of sessions at the user plane function instance, and a predicted number of requests to be served at the user plane function instance.

Figure 7B:
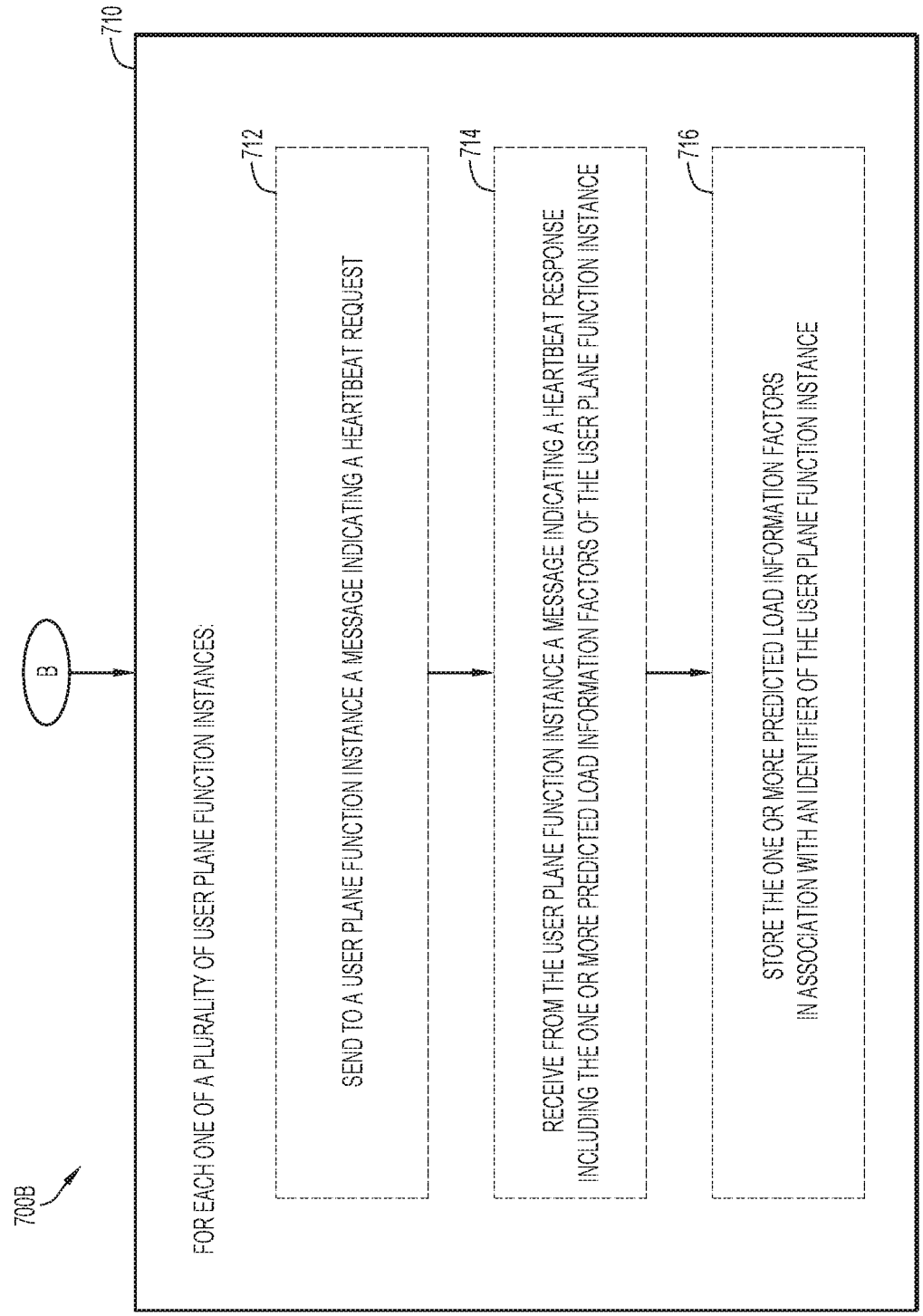

FIG. 7B is a flowchart 700B for describing a method for use in selecting a UPF instance for a packet data session for a UE according to some implementations of the present disclosure. The method may be performed by a network node operative as a control plane entity (e.g. a control plane entity for session management or an SMF) in a mobile network. The method may be embodied in a computer program product which includes a non-transitory computer readable medium and instructions stored in the non-transitory computer readable medium, where the instructions are executable by one or more processors of the network node to perform steps of the method.

The method of FIG. 7B may be incorporated in the method of FIG. 7A via a connector B as indicated in FIG. 7A. Beginning at the connector B of FIG. 7B, the network node may perform a message exchange procedure for each one of a plurality of user plane function instances (step 710 of FIG. 7B). The message exchange procedure may be a heartbeat procedure or mechanism between network nodes. In the message exchange procedure, the network node may send to a user plane function instance a message indicating a heartbeat request (step 712 of FIG. 7B). The network node may receive from the user plane function instance a message indicating a heartbeat response (step 714 of FIG. 7B). The heartbeat response may include one or more predicted load information factors of the user plane function instance. In addition, the heartbeat response may include one or more current load information factors of the user plane function instance. The network node may store the one or more predicted load information factors (as well as the one or more current load information factors) in association with an identifier of the user plane function instance (step 716 of FIG. 7B). The message exchange procedure which includes the sending, the receiving, and the storing may be regularly repeated for each one of the plurality of user plane function instances. A predicted load information factor may be indicative of a predicted load for a user plane function instance. The predicted load information factor may be based on a plurality of predicted load contribution factors associated with a plurality of UEs being served by the user plane function instance. Accordingly, the network node may store and track the predicted load for each one of the user plane function instance.

Figure 7C:
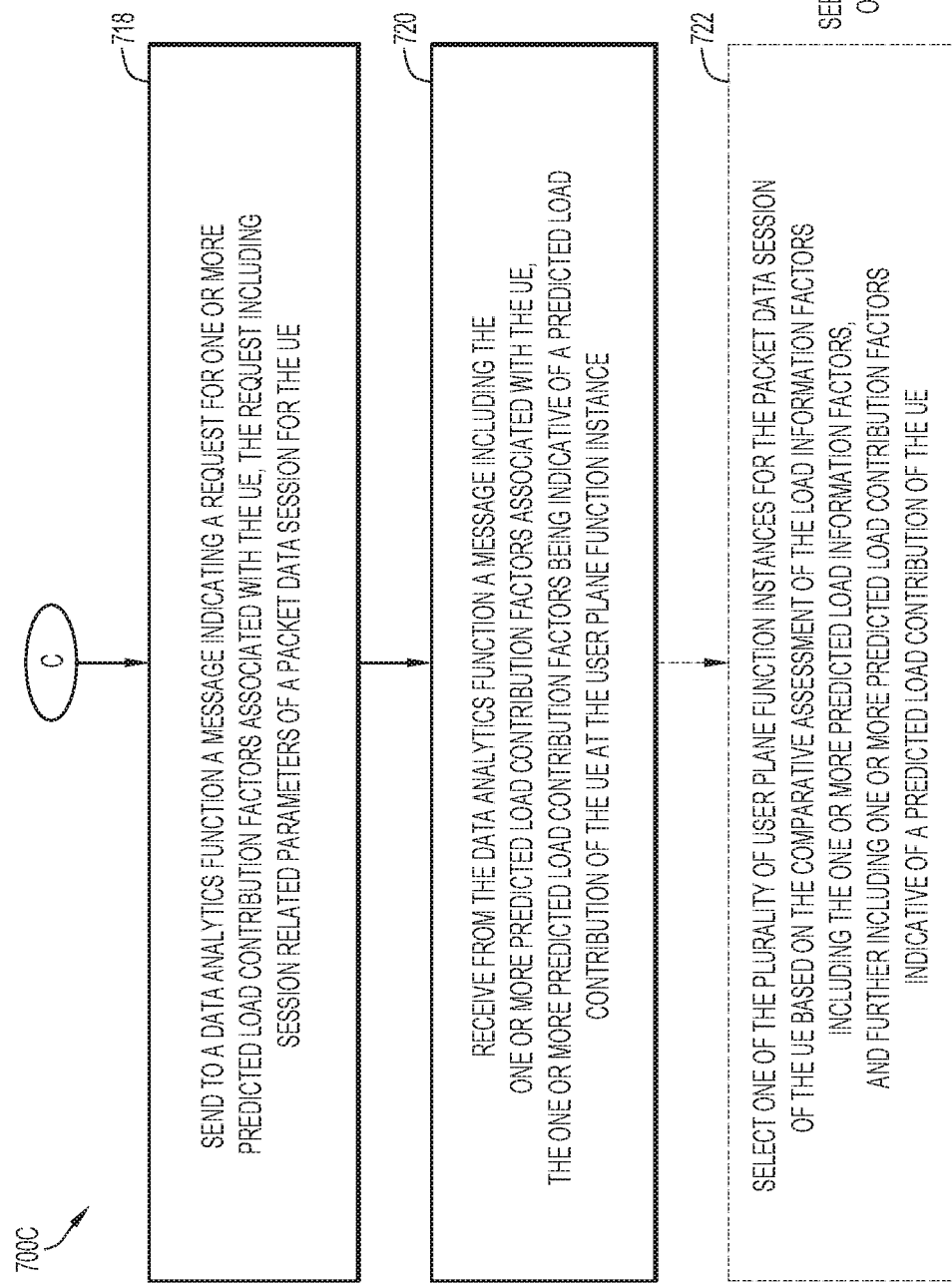

FIG. 7C is a flowchart 700C for describing a method for use in selecting a UPF instance for a packet data session for a UE according to some implementations of the present disclosure. The method may be performed by a network node operative as a control plane entity (e.g. a control plane entity for session management or an SMF) in a mobile network. The method may be embodied in a computer program product which includes a non-transitory computer readable medium and instructions stored in the non-transitory computer readable medium, where the instructions are executable by one or more processors of the network node to perform steps of the method.

The method of FIG. 7C may be incorporated in the method of FIG. 7A via a connector C as indicated in FIG. 7A. Beginning at the connector C of FIG. 7C, the network node may send to a data analytics function (e.g. an NWDAF) a message indicating a request (step 718 of FIG. 7C). The request may be for one or more predicted load contribution factors associated with a packet data session to be established for the UE. The request may include one or more session-related parameters of the packet data session for the UE. The network node may receive from the data analytics function a message including the one or more predicted load contribution factors associated with the UE (step 720 of FIG. 7C). The one or more predicted load contribution factors may be indicative of a predicted load contribution of the UE at the user plane function instance. Each predicted load contribution factor may generated or calculated according to a model or model function which is derived based on historical usage data of previous sessions of one or more UEs, where the model or model function receives session-related parameters of the packet data session as input. The historical usage data used to generate the model or model function may be obtained from or derived based on data from CDRs of the previous sessions. The network node may select one of the plurality of user plane function instances for the packet data session of the UE based on a comparative assessment of load information factors including one or more predicted load information factors and the one or more predicted load contribution factors indicative of the predicted load contribution of the packet data session to be established for the UE (step 722 of FIG. 7C).

Figure 7D:
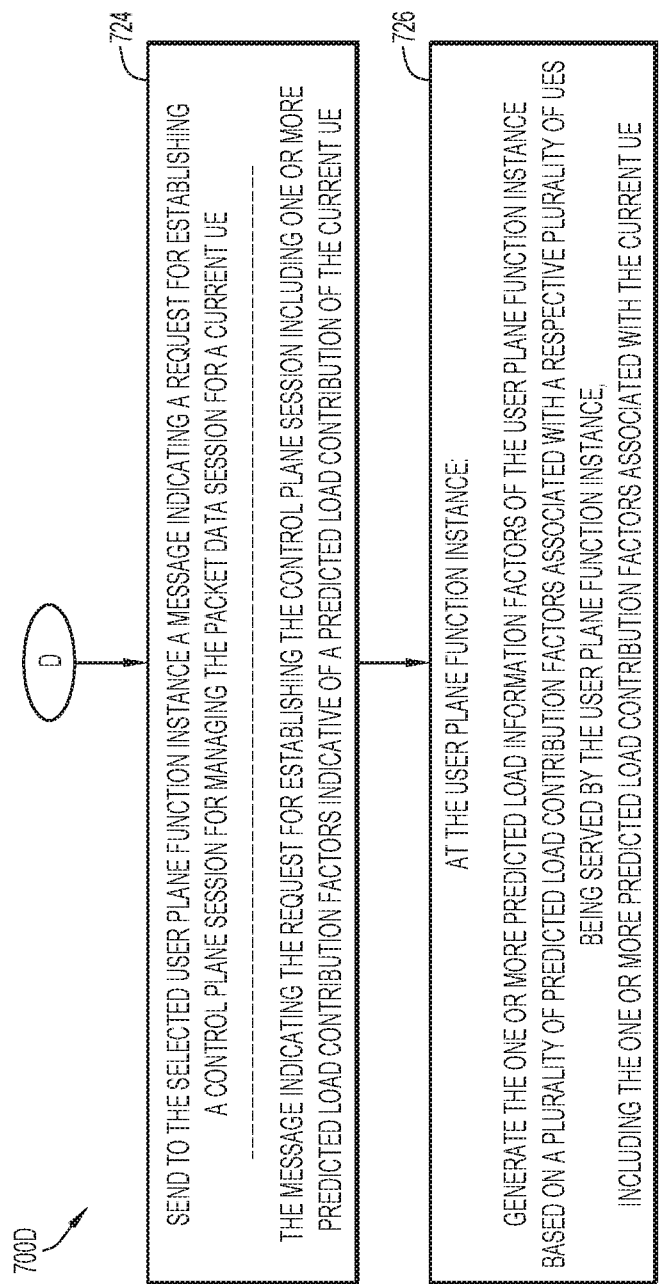

FIG. 7D is a flowchart 700D for describing a method for use in selecting a UPF instance for a packet data session for a UE according to some implementations of the present disclosure. The method may be performed by a network node operative to provide a control plane entity (e.g. a control plane entity for session management or an SMF) in a mobile network. The method may be embodied in a computer program product which includes a non-transitory computer readable medium and instructions stored in the non-transitory computer readable medium, where the instructions are executable by one or more processors of the network node to perform steps of the method.

The method of FIG. 7D may be incorporated in the method of FIG. 7A via a connector D as indicated in FIG. 7A. Beginning at the connector D of FIG. 7D, the network node may send to a selected user plane function instance a message indicating a request for establishing a control plane session for managing a packet data session for a UE (step 724 of FIG. 7D). The message indicating the request for establishing the control plane session may include one or more predicted load contribution factors indicative of a predicted load contribution of the UE. In some implementations, the user plane function instance may operate to generate one or more predicted load information factors associated with the user plane function instance based on a plurality of predicted load contribution factors associated with a plurality of UEs being served by the user plane function (step 726 of FIG. 7D). The user plane function instance may regenerate (or update) the one or more predicted load information factors to include (or take into consideration) the one or more predicted load contribution factors indicative of the predicted load contribution associated with the packet data session to be established for the UE.

Figure 8:
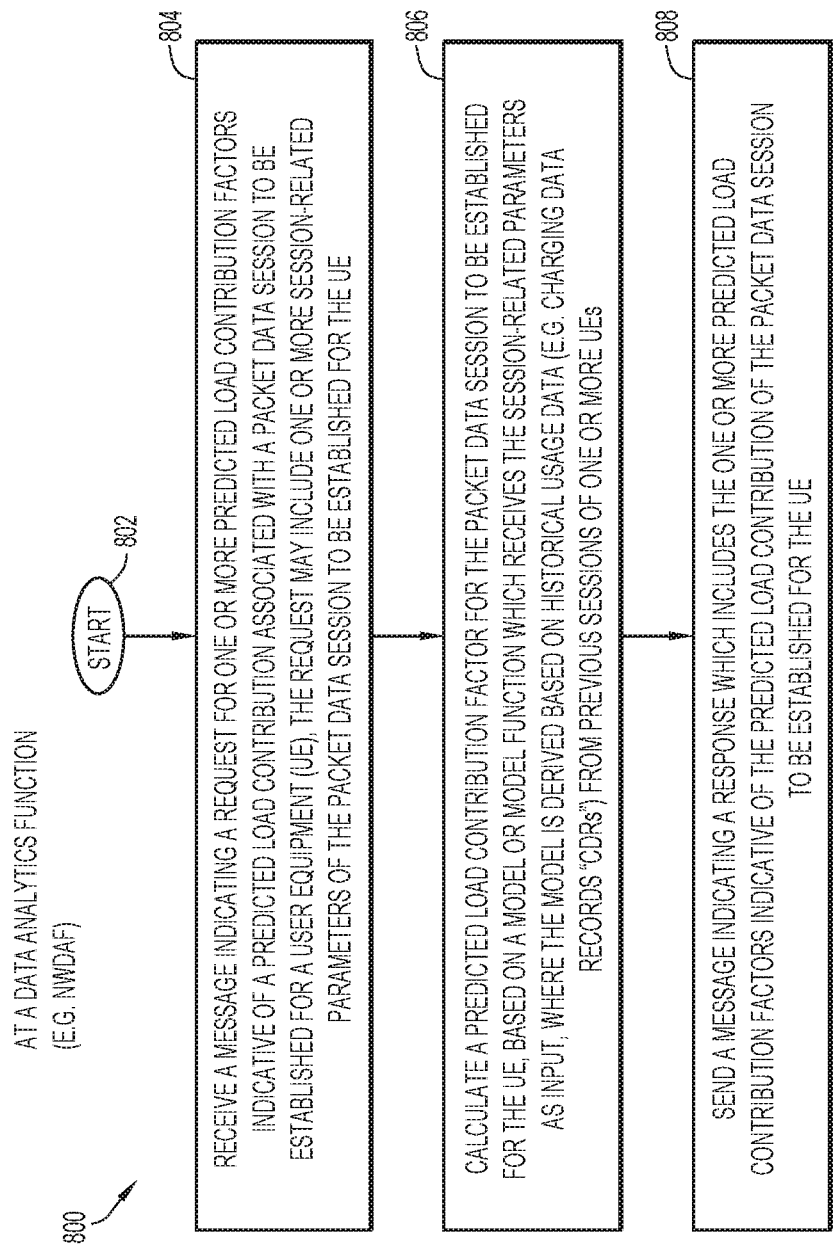
FIG. 8 is a flowchart for describing a method for use in selecting a UPF instance of a mobile network for a packet data session for a UE, and more specifically a method for generating a predicted load contribution associated with a packet data session to be established for the UE, which may be performed by a data analytics function such as a network data analytics function (NWDAF), according to some implementations of the present disclosure.

FIG. 8 is a flowchart 800 for describing a method for use in selecting a UPF instance for a packet data session for a UE according to some implementations of the present disclosure. More specifically, the flowchart 800 of FIG. 8 describes a method for generating a predicted load contribution associated with the packet data session for the UE. The method may be performed by a network node operative to provide a data analytics function, such as a NWDAF, in a mobile network. The method may be embodied in a computer program product which includes a non-transitory computer readable medium and instructions stored in the non-transitory computer readable medium, where the instructions are executable by one or more processors of the network node to perform steps of the method.

Beginning at a start block 802 of FIG. 8, the network node (e.g. the NWDAF) may receive a message indicating a request for one or more predicted load contribution factors indicative of a predicted load contribution associated with a packet data session to be established for a UE (step 804 of FIG. 8). The request may include one or more session-related parameters of the packet data session to be established for the UE. The network node may calculate a predicted load contribution factor for the packet data session to be established for the UE, based on a model or model function which receives the session-related parameters as input (step 806 of FIG. 8). The model may be derived based on historical usage data from previous packet data sessions associated with the UE. In some preferred implementations, the historical usage data may be obtained from or derived based on data from CDRs associated with the UE. The network node may send a message indicating a response which includes the one or more predicted load contribution factors indicative of the predicted load contribution of the packet data session to be established for the UE (step 808 of FIG. 8).

With reference back to FIG. 4A additional details regarding model 422 at NWDAF 138 are now provided. Again, predicted load information for each one of UPFs 402 may be generated based on a plurality of predicted load contributions associated with a plurality of UEs served by the UPF. Each predicted load contribution associated with a packet data session to be established for a UE may be generated with use of NWDAF 138. To that end, NWDAF 138 includes model building process 420 for building model 422. Model building process 420 may be utilized for calculating one or more predicted load contribution factors based on one or more session-related parameters of a packet data session to be established for the UE. Historical usage data 424 may be input to model building process 420 for building model 422. Historical usage data 424 may be generated based on data from CDRs associated with the UEs. For a given UE, the CDRs associated with the UE record the historical usage of the UE (e.g. summaries and/or details of its previous packet data sessions).

In some implementations, NWDAF 138 may be configured with model building process 420 which may include a model building block and a model engine—predicted load factor function. In the present example to be described, the model building block may build a subscriber usage prediction (e.g. an average bitrate and a duration for a subscriber) based on historical usage data fed into the model engine. The historical usage data may be taken or derived from CDRs from previous sessions of one or more UEs (e.g. previous CDRs from previous session of the current UE). In some implementations, this may be a one-time process; in other implementations, model 422 may be initially generated and (regularly) regenerated with new, more current CDR data. Once the building of model 422 is complete, model 422 may receive input from SMF 118 and predict an average bitrate of a subscriber. The predicted load factor function may convert a predicted average bitrate to a predicted load contribution of the UPF.

Once SMF 118 receives the predicted load contribution, it may use the predicted load contribution of the subscriber and a predicted load information profile shared by the UPFs 402 in the selection criteria to select an optimal UPF (e.g. UPF instance 412) for the packet data session. After selecting UPF instance 412), SMF 118 may communicate the predicted average bitrate or usage, the predicted duration, and predicted load contribution of the packet data session to UPF instance 412 in a session establishment procedure. This information may be used by UPF instance 412 to update its own predicted load information which will be communicated to all the SMFs associated with UPF instance 412. Accordingly, the analytics framework is configured to self-correct the prediction model based on the actual usage feedback (e.g. event-based feedback).

In some preferred implementations, model 422 may be or be based on a multiple linear regression (MLR) model. In the example to be described, model 422 may be created to establish a relationship between an average bitrate of a subscriber and its dependent session-related parameters (e.g.

a subscriber identifier, a location, a previous usage pattern etc.). More particularly, model 422 may be used for predicting a duration of a packet data session as well as an average bitrate (e.g. a number of bits used over the duration). When model 422 is generated by model building process 420, an R-square value may be generated for that model 422 and tested to be above a threshold value. The R-square value which is a metric for model selection may be a percentage of variability explained from model 422. A model having an R-square>0.7 may be considered to be a good model.

The following is a description of model 422, using an example for demonstration purposes according to a proof-of-concept (POC) simulation.

Pre-processed CDR data may be used for model building process 420. With further reference ahead to FIG. 9, a set of data 900 (e.g. historical usage data) which are derived from CDRs associated with one or more UEs is shown. The set of data 900 may be for use in calculating one or more predicted load contribution factors associated with a packet data session to be established for a UE. In FIG. 9, the set of data 900 is provided in the form of a table having a plurality of rows 902 which represent time slots (or day/time slots) of subscriber usage and a plurality of columns 904 indicating a plurality of session-relation parameters. In this example, the session-related parameters as indicated in the columns 904 include a timestamp parameter 906, a day parameter 908, an hour of the day parameter 910, a location parameter 912, a UE time zone (UE_TZ) parameter 914, a device type parameter 916, a RAT type parameter 918, a subscription parameter 920, a duration parameter 922, and a bitrate parameter 924 (e.g. average bitrate in Mbps). One of rows 902 is a row 930 indicating a day/time slot of Sunday at Mar. 3, 2019 at 9:00 am which is associated with a bitrate of 78.0515 Mbps.

More generally from FIG. 9, for a given UE, historical usage data used to derive the model may include or be derived from a plurality of usage indicator values (e.g. the column indicated bitrate parameter 924 in FIG. 9) associated with a plurality of previous sessions of the UE, and, each usage indicator value, a set of session characteristics associated with the previous session of the UE. This historical usage data may alternatively include or be derived from a plurality of usage indicator values (e.g. again the column indicated bitrate parameter 924 in FIG. 9) associated with a plurality of previous sessions of multiple UEs or applications of the same or similar type or context, and for each usage indicator value, a set of session characteristics of the previous sessions associated with the multiple UEs or applications. A usage indicator value indicative of usage of previous session(s) may be based on an average or aggregation of usage indicator values of the same or similar type or context.

In the present example, two models are developed: one model for predicting the "duration" of the subscriber session and another model for predicting the "bitrate" over the duration (e.g. slot by slot). Specifically further, two supervised learning algorithmic models are developed:

Model-1: to predict the duration of the subscriber session from the features or parameters (e.g. "Day," "Hour of the day," "Location," "UE_TZ," "Device Type,", "RAT Type," and "Subscription") where the "Duration" is predicted; and Model-2: to predict the duration of the usage (i.e. bitrate) for the subscriber session over a particular slot (e.g. "Day," "Hour of the day," "Location," "UE_TZ," "Device Type,", "RAT Type," and "Subscription") where the "BitRate_in_Mbps" is predicted.

In this example, the algorithm used for both Model-1 and Model-2 is a dynamic and adaptive multiple linear regression model. Multiple linear regression is a statistical prediction technique to identify a best possible fit for the output variable as a linear combination of "betas" $\beta$ (i.e. model or regression coefficients) which are the coefficients for the input (i.e. predictor variables or features). Performance of the MLR may be measured according to R-square (e.g. the higher the better), which measures the variability in the output explained by the predictors.

Again, the multiple linear regression model may utilized to determine a predicted load contribution associated with a packet data session to be established for a UE. The multiple linear regression model may be or be based on an expression $$y = \beta_0 + \beta_1 x_1 + \beta_2 x_2 + \ldots \beta_k x_k$$

or $$y = \beta_0 + \beta_1 x_1 + \beta_2 x_2 + \ldots \beta_k x_k + \epsilon$$

where y is a response variable y which is an output that represents the predicted load contribution value or, alternatively, a value from which the predicted load contribution value may be derived; $\beta_1, \beta_2, \ldots, \beta_k$ are regression coefficients are coefficients which may derived based on the historical usage data associated with previous sessions of the UE or multiple UEs or applications of the same or similar type or context;

$x_1, x_2, \ldots x_k$ are predictor variables of the model, where the session-related parameters associated with the packet data session to be established for the UE may be input as the predictor variables $x_1, x_2, \ldots x_k$; and $\epsilon$ are residual terms of the model and distribution assumptions that may be placed on the residuals for a later inference on the remaining model parameters, for use in some implementations if and as needed.

In this model, historical CDR data utilized may be split into training and test data to develop a suitable MLR base model $MLR_0$ based on the training data. A predetermined threshold or standard (e.g. a significantly high R-square) may be set to achieve one or more suitable production-ready MLR base models as desired. Note that the $MLR_0$ may depend closely on the data, as well as the derived and interaction variables that can be emerge based on the insights from the specific data.

FIG. 10 is an example of an $MLR_0$ model 1000 for "duration" for a subscriber session based on historical usage data which is derived from CDR data. The $MLR_0$ model 1000 for duration is in the form of a table having a plurality of rows 1002 indicating entries and a plurality of columns 1004 which indicate features 1006 and associated model or regression coefficients 1008.

Figure 11:
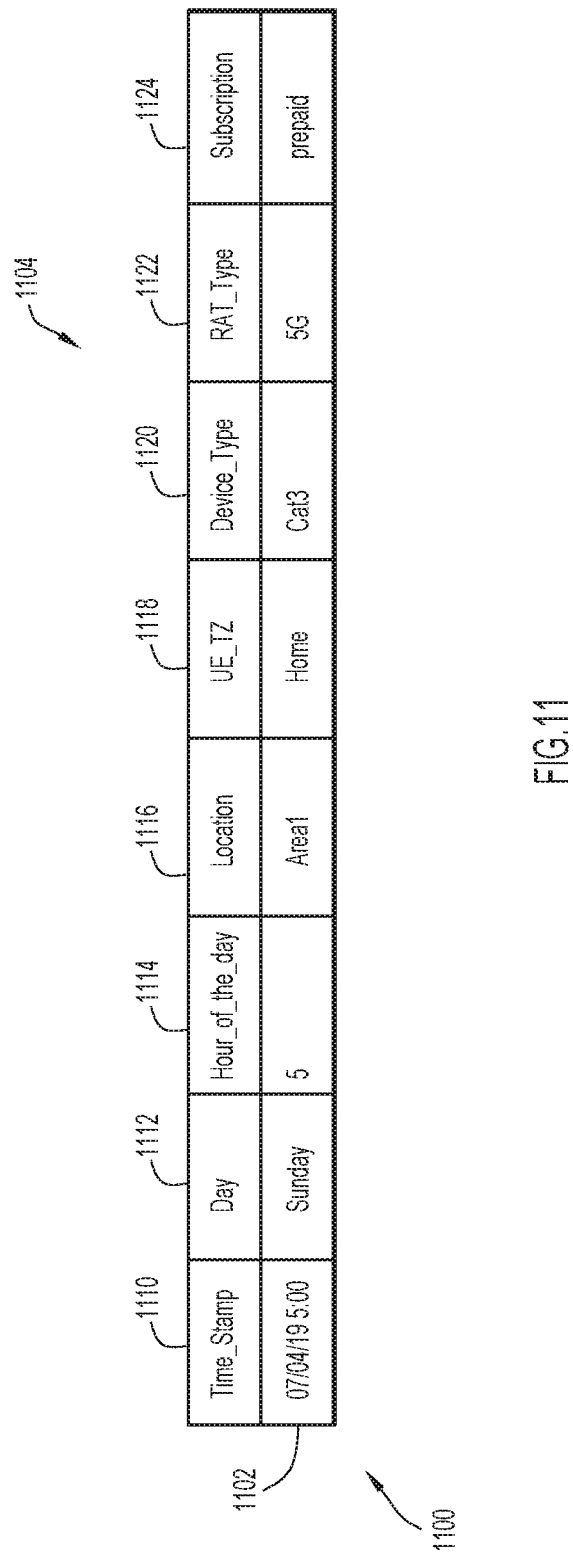
FIG. 11 is an example set of session-related parameters of a packet data session to be established for a UE, for calculating one or more predicted load contribution factors associated with the packet data session.

FIG. 11 is a list 1100 of session-related parameters of a subscriber session upon connection, for use in predicting the duration when the subscriber connects. The list 1100 of session-related parameters is provided in the form of a table having a row 1102 which represents a time slot (or day/time slot) associated with the subscriber session to be established and a plurality of columns 1104 indicating the session-relation parameters. Again, in this example, the session-related parameters as indicated in the columns 1104 include a timestamp parameter 1110, a day parameter 1112, an hour of the day parameter 1114, a location parameter 1116, a UE time zone (UE_TZ) parameter 1118, a device type parameter 1120, a RAT type parameter 1122, and a subscription parameter 1124. Row 1102 indicates a day/time slot of Sunday at Jul. 4, 2019 at 5:00 am. Here, the duration may be calculated as Duration=(−0.08812)*Subscriptionprepaid+(−
0.01077)*TFC Hour of the day(4,5]+(−1.14953)
*TFC Hour of the day(5,6]=17.46008+0.29175+
0.48216−0.08812−0.01077−1.14953=16.98557

FIG. 12 is an example of an $MLR_0$ model 1200 for "average bitrate" for the same subscriber over the predicted duration based on historical usage data which is derived from CDR data. The $MLR_0$ model 1200 for average bitrate is in the form of a table having a plurality of rows 1202 indicating entries and a plurality of columns 1204 which indicate features 1206 and associated model or regression coefficients 12008.

Prediction of the average bitrate over duration of a subscriber is demonstrated as follows. With respect to the model's dynamic property, as new models are generated, old models are deactivated based on performance of those models on a newer set of data (R-square). This ensures that the model accommodates changes of trend in time-series data. In some implementations, when there are multiple models (e.g. $MLR_1$, $MLR_2$, $MLR_3$, etc.) having satisfactory R-square values, live prediction may be based on a weighted average of all the relevant models; here, the weight of each model may be directly proportional to the R-square value. In some implementations, if there is an insufficient number of previous records for a subscriber, the prediction for the subscriber may be performed using a subscriber-agnostic model. This subscriber-agnostic model may be built, for example, using data from a relative large number of subscribers from the general population.

As described herein above, techniques and mechanisms of the present disclosure relate to an analytics-driven approach for selecting an optimal UPF based on a prediction of subscriber usage in advance. The approaches described herein may be easily extended more generally to network resource selection in multiple networks. Further, the techniques and mechanisms of the present disclosure may be easily integrated with existing approaches, with minimal changes, and triggered if, as, and when needed. Accordingly, a new framework has emerged that may be integrated into 5G solutions, relating to UPF, SMF, and PCF designs. In some implementations, the proposed functionality of at the NWDAF may be built as a Deep Packet Inspection (DPI) processing extension to the SMF.

Accordingly, one or more advantages or benefits may be realized. For one, the "proactive" UPF selection of the present disclosure may be easily scaled according to the selection of any type of NF in a 5G network. Second, the model of model function may be implemented based on an individual usage as well as collective usage (e.g. user-agnostic model, which may be based on features such as location, device details, subscription package, time of the day, special event day or not, etc.). Further, as the UE may be agnostic to the procedure, no extra load needs to be placed on a given UE, thereby saving battery power of UEs.

In some implementations, an error handling mechanism for throttling the maximum user bandwidth at the predicted usage may be provided. Here, a notification may be provided by the NWDAF to the SMF via the PCF. This may useful in scenarios where service providers are offering best effort packages with a guaranteed minimum (e.g. guaranteed 100 Mbps base speed plus up to 5 Gigabits per second "Gbps"). Here, for example, subscribers may be offered different speeds on top of a guaranteed speed of 100 Megabits per second (Mbps), depending on average usage, during network congestion scenarios.

Figure 13:
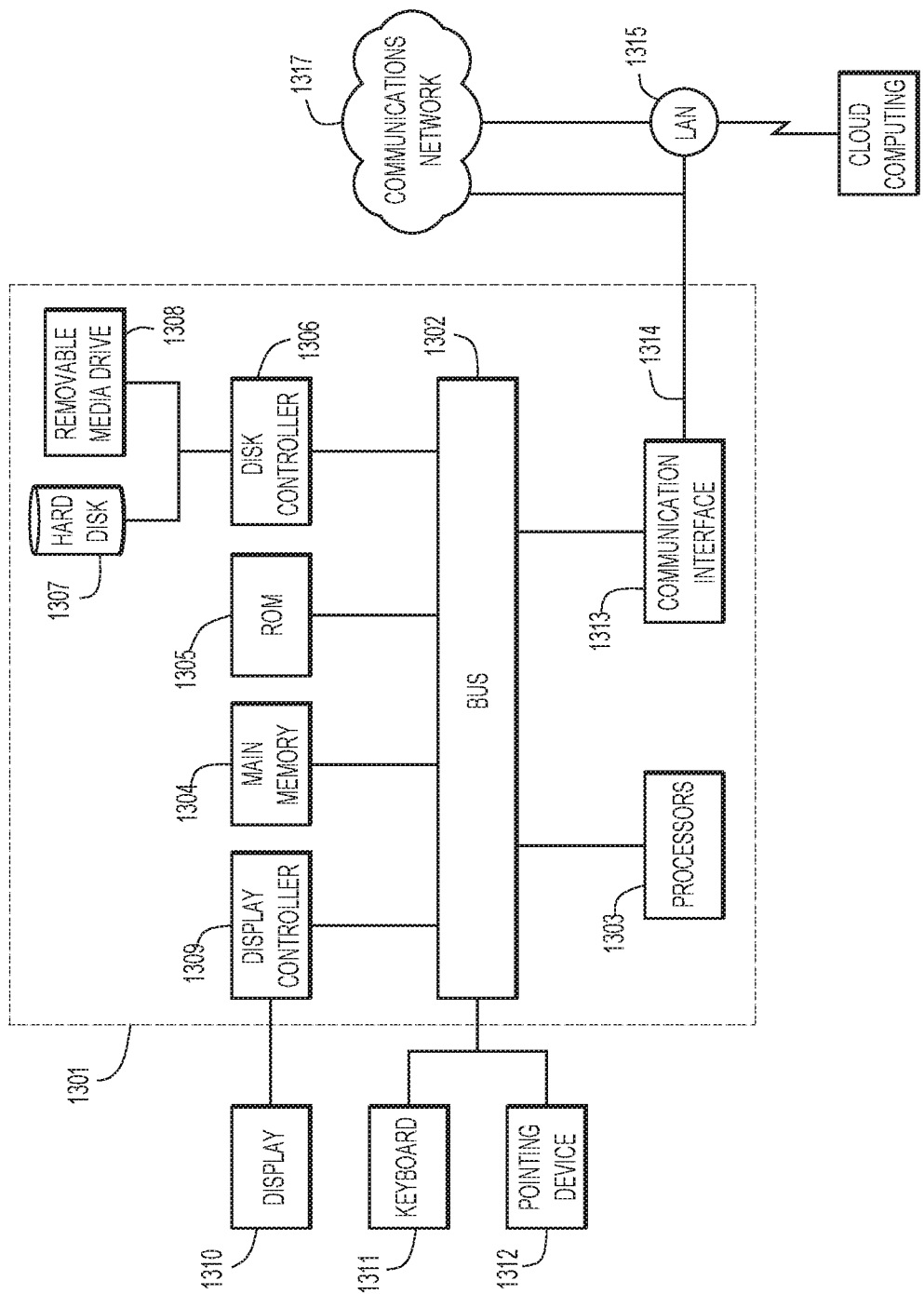
FIG. 13 is a schematic block diagram of a network node or server, which may be operative to provide a data analytics function or NWDAF according to some implementations.

FIG. 13 is a block diagram of a network node, such as a server, according to some implementations of the present disclosure. Such a network node or server may be operative to provide a data analytics function or NWDAF according to some implementations. In some implementations, the network node or server may comprise a computer system 1301 which may include one or more processors 1303 coupled to a bus 1302 or other information communication mechanism. The one or more processors 1303 may be configured to process information which may be communicated over bus 1302. While FIG. 13 shows a single block for processor 1303, processors 1303 may in actual practice represent a plurality of processing cores, each of which may perform separate processing.

Computer system 1301 may also include a main memory 1304, such as a random access memory (RAM) or other dynamic storage device (e.g. dynamic RAM or "DRAM," static RAM or "SRAM," and synchronous DRAM or "SD RAM," coupled to the bus 1302 for storing information and instructions to be executed by processor 1303. The main memory 1304 may be used for storing temporary variables or other intermediate information during the execution of instructions by the processor 1303. Computer system 1301 may further include a read only memory (ROM) 1305 or other static storage device (e.g. a programmable ROM or "PROM," an erasable PROM "EPROM," or an electrically erasable PROM "EEPROM") coupled to the bus 1302 for storing static information and instructions for the processor 1303.

Computer system 1301 may also include a disk controller 1306 coupled to the bus 1302 to control one or more storage devices for storing information and instructions, such as a magnetic hard disk 1307, and a removable media drive 1308 (e.g. a floppy disk drive, a read-only compact disc drive, a read/write compact disc drive, a compact disc jukebox, a tape drive, and a removable magneto-optical drive). The storage devices may be added to the computer system 1301 using an appropriate device interface (e.g. a small computer system interface or "SCSI," an integrated device electronics or "IDE," an enhanced-IDE "E-IDE," a direct memory access "DMA," or an ultra-DMA).

Computer system 1301 may also include special purpose logic devices (e.g. application specific integrated circuits or "ASICs") or configurable logic devices (e.g. simple programmable logic devices or "SPLDs," complex programmable logic devices or "CPLDs," and field programmable gate arrays or "FPGAs") that, in addition to microprocessors and digital signal processors may individually, or collectively, are types of processing circuitry. The processing circuitry may be located in one device or distributed across multiple devices.

Computer system 1301 may also include a display controller 1309 coupled to the bus 1302 to control a display 1310, such as a cathode ray tube (CRT), for displaying information to a computer user. Computer system 1301 includes input devices, such as a keyboard 1311 and a pointing device 1312, for interacting with a computer user and providing information to the processor 1303. The pointing device 1312, for example, may be a mouse, a trackball, or a pointing stick for communicating direction information and command selections to the processor 1303 and for controlling cursor movement on the display 1310.

Computer system 1301 performs a portion or all of the processing steps of the process in response to the processor 1303 executing one or more sequences of one or more instructions contained in a memory, such as the main memory 1304. Such instructions may be read into the main memory 1304 from another computer readable medium, such as a hard disk 1307 or a removable media drive 1308.

One or more processors in a multi-processing arrangement may also be employed to execute the sequences of instructions contained in main memory 1304. In alternative embodiments, hard-wired circuitry may be used in place of or in combination with software instructions. Thus, embodiments are not limited to any specific combination of hardware circuitry and software.

As stated above, computer system 1301 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (e.g. EPROMs, EEPROMs, or flash EPROMs), DRAM, SRAM, SD RAM, or any other magnetic medium, compact discs (e.g. CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 1301, for driving a device or devices for implementing the process, and for enabling the computer system 1301 to interact with a human user. Such software may include, but is not limited to, device drivers, operating systems, development tools, and applications software. Such computer readable storage media may further include a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

Computer system 1301 also includes a communication interface 1313 coupled to the bus 1302. The communication interface 1313 provides a two-way data communication coupling to a network link 1314 that is connected to, for example, a local area network (LAN) 1315, or to a communications network 1317 such as the Internet. For example, the communication interface 1313 may be a wired or wireless network interface card to attach to any packet switched (wired or wireless) LAN. As another example, the communication interface 1313 may be an asymmetrical digital subscriber line (ADSL) card, an integrated services digital network (ISDN) card, or a modem to provide a data communication connection to a corresponding type of communications line. Wireless links may also be implemented. In any such implementation, the communication interface 1313 sends and receives electrical, electromagnetic or optical signals that carry digital data streams representing various types of information.

The network link 1314 typically provides data communication through one or more networks to other data devices. For example, the network link 1314 may provide a connection to another computer through LAN 1315 or through equipment operated by a service provider, which provides communication services through a communications network 1317. The LAN 1315 and the communications network 1317 use, for example, electrical, electromagnetic, or optical signals that carry digital data streams, and the associated physical layer (e.g. CAT 5 cable, coaxial cable, optical fiber, etc.). The signals through the various networks and the signals on the network link 1314 and through the communication interface 1313, which carry the digital data to and from the computer system 1301 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1301 can transmit and receive data, including program code, through the network(s) 1315 and 1317, the network link 1314 and the communication interface 1313. Moreover, the network link 1314 may provide a connection through LAN 1315 optionally to a cloud computing network as indicated.

Figure 14:
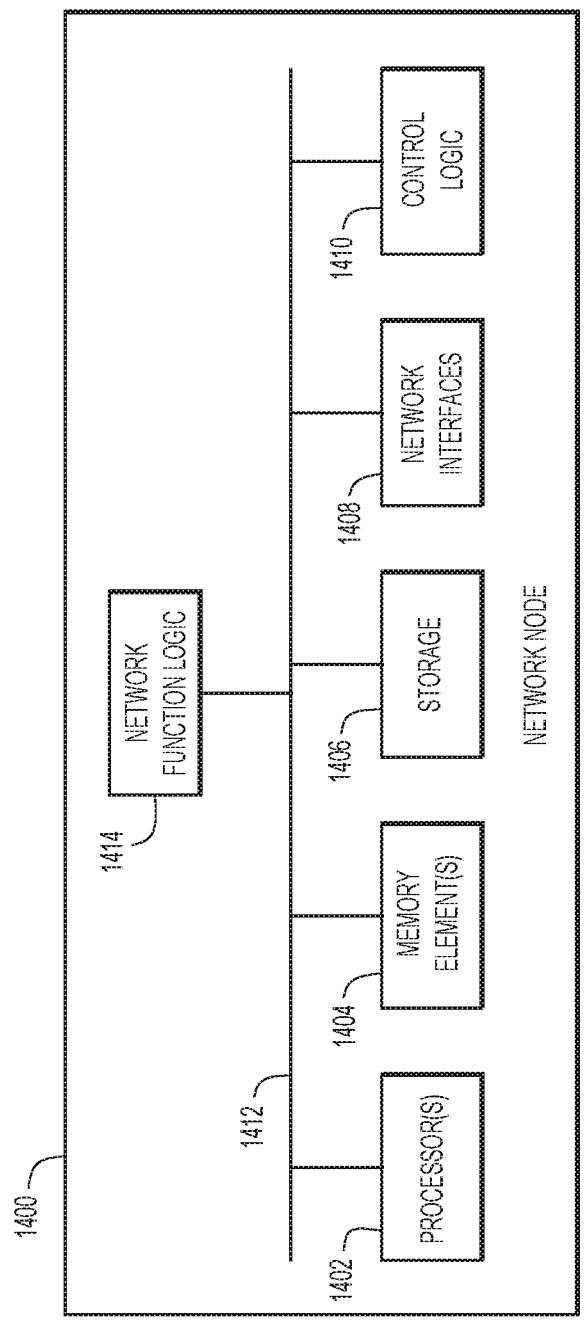
FIG. 14 is a schematic block diagram of a network node which may be operative to provide a control plane entity, such as a control plane entity for session management (e.g. an SMF), according to some implementations.

FIG. 14 is a schematic block diagram of a network node 1400 (network equipment, a compute or computing node) which may operative as a control plane entity, such as a control plane entity for session management (e.g. an SMF) in accordance with some implementations. In various embodiments, network element functionality may be performed using any combination of network nodes. In various embodiments, network node 1400 can be implemented as, for example, a data center network node such as a server, rack of servers, multiple racks of servers, etc., for a data center; or a cloud network node, which may be distributed across one or more data centers.

In some implementations, network node 1400 may include may include one or more processors 1402, one or more memory elements 1404, storage 1406, network interfaces 1408, control logic 1410 and network function logic 1414. In some implementations, the processors 1402 are at least one hardware processor configured to execute various tasks, operations and/or functions for network node 1400 as described herein according to software and/or instructions configured for the network node 1400. In some implementations, memory elements 1404 and/or storage 1406 are configured to store data, information, software, instructions, logic (e.g. any logic 1410 and/or 1414), data structures, combinations thereof, or the like for various embodiments described herein. Note that in some implementations, storage may be consolidated with memory elements (or vice versa), or may overlap/exist in any other suitable manner.

In some implementations, network interfaces 1408 enable communication between for network node 1400 and other network elements, systems, slices, etc. that may be present in the system to facilitate operations as discussed for various embodiments described herein. In some implementations, network interfaces 1408 may include one or more Ethernet drivers and/or controllers, Fiber Channel drivers, and/or controllers, or other similar network interface drivers and/or controllers to enable communications for network node 1400 within the system.

In some implementations, control logic 1410 may include instructions that, when executed (e.g. via processors 1402), cause for network node 1400 to perform operations, which may include, but not be limited to, providing overall control operations of network node 1400; cooperating with other logic, data structures, etc. provisioned for and/or maintained by network node 1400; combinations thereof; or the like to facilitate various operations as discussed for various embodiments described herein.

In some implementations, bus 1412 may be configured as an interface that enables one or more elements of network node 1400 (e.g. processors 1402, memory elements 1404, logic, etc.) to communicate in order to exchange information and/or data. In at least one embodiment, bus 1412 may be implemented as a fast kernel-hosted interconnect, potentially using shared memory between processes (e.g. logic, etc.), which may enable efficient communication paths between the processes.

In some implementations, network function logic 1414 may include instructions that, when executed (e.g. via one or more processors 1402) cause network node 1400 to perform one or more operations for one or more network elements as discussed for various implementations described herein.

In some implementations, each of the elements of the system may couple to one another through simple interfaces or through any other suitable connection (wired or wireless), which provides a viable pathway for network communications. As referred to herein, a physical (wired or wireless) interconnection or interface may refer to an interconnection of one element or node with one or more other element(s), while a logical interconnection or interface may refer to communications, interactions and/or operations of elements with each other, which may be directly or indirectly interconnected, in a network environment.

The terms 'data', 'information', 'parameters' and variations thereof as used herein may refer to any type of binary, numeric, voice, video, textual or script data or information or any type of source or object code, or any other suitable data or information in any appropriate format that may be communicated from one point to another in electronic devices and/or networks. Additionally, messages, requests, responses, replies, queries, etc. are forms of network traffic and, therefore, may comprise one or more packets.

In some implementations, a network may be associated with and/or provided by a single network operator or service provider and/or multiple network operators or service providers. In various embodiments, the network node may include and/or overlap with, in whole or in part, one or more packet data network(s) (e.g. one or more packet data networks). A network may offer communicative interfaces between various elements and may be further associated with any LAN, wireless local area network (WLAN), metropolitan area network (MAN), wide area network (WAN), virtual private network (VPN), RAN, virtual local area network (VLAN), enterprise network, Intranet, extranet, Low Power Wide Area Network (LPWAN), Low Power Network (LPN), M2M network, IoT Network, or any other appropriate architecture or system that facilitates communications in a network environment.

The terms 'UE', 'mobile device,' 'mobile radio device,' 'end device', 'user', 'subscriber' or variations thereof can be used herein interchangeably and are inclusive of devices used to initiate a communication, such as a computer, an electronic device such as an IoT device (e.g. an appliance, a thermostat, a sensor, a parking meter, etc.), a personal digital assistant (PDA), a laptop or electronic notebook, a cellular telephone, an IP phone, an electronic device having cellular and/or Wi-Fi connection capabilities, a wearable electronic device, or any other device, component, element, or object capable of initiating voice, audio, video, media, or data exchanges within the system. A UE may also be inclusive of a suitable interface to a human user such as a microphone, a display, a keyboard, or other terminal equipment.

Note that in some implementations, operations as outlined herein to facilitate techniques of the present disclosure may be implemented by logic encoded in one or more tangible media, which may be inclusive of non-transitory tangible media and/or non-transitory computer readable storage media (e.g. embedded logic provided in an ASIC, in digital signal processing (DSP) instructions, software—potentially inclusive of object code and source code—to be executed by a processor, or other similar machine, etc.). In some of these instances, a memory element and/or storage may store data, software, code, instructions (e.g. processor instructions), logic, parameters, combinations thereof or the like used for operations described herein. This includes memory elements and/or storage being able to store data, software, code, instructions (e.g. processor instructions), logic, parameters, combinations thereof, or the like that are executed to carry out operations described herein.

A processor (e.g. a hardware processor) may execute any type of instructions associated with data to achieve the operations detailed herein. In one example, a processor may transform an element or an article (e.g. data, information) from one state or thing to another state or thing. In another example, operations outlined herein may be implemented with logic, which may include fixed logic, hardware logic, programmable logic, digital logic, etc. (e.g. software/computer instructions executed by a processor), and/or one or more the elements identified herein could be some type of a programmable processor, programmable digital logic (e.g. a field programmable gate array (FPGA), a DSP processor, an EPROM, a controller, an electrically erasable PROM (EEPROM), or an ASIC) that includes digital logic, software, code, electronic instructions, or any suitable combination thereof.

It is also noted that the operations and steps described with reference to the preceding figures illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that the system (and its teachings) are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, the system may be applicable to other exchanges or routing protocols, interfaces, and/or communications standards, proprietary, and/or non-proprietary. Moreover, although the system has been illustrated with reference to particular elements and operations that facilitate the communication process, these elements, and operations may be replaced by any suitable architecture or process that achieves the intended functionality of the system.

Although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

It will also be understood that, although the terms "first," "second," etc. may be used herein to describe various elements, these elements should not be limited by these terms. These terms are used to distinguish one element from another. For example, a first predicted load could be termed a second predicted load, and similarly, a second predicted load could be termed a first predicted load, without changing the meaning of the description, so long as all occurrences of the "first predicted load" are renamed consistently and all occurrences of the "second predicted load" are renamed consistently. The first predicted load and the second predicted load are both predicted loads, but they are not the same predicted load.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a network node comprising a session management function (SMF) for use in a mobile network,
        maintaining storage of a plurality of sets of load information factors, each set of load information factors being associated with a respective one of a plurality of user plane function instances and including one or more predicted load information factors indicative of a total predicted load at the user plane function instance;
        receiving a message indicating a request for establishing a protocol data unit (PDU) session for a user equipment (UE);
        in response to the receiving, sending to a network data analytics function a message indicating a request for one or more predicted load contribution factors for the PDU session to be established for the UE, the request including session-related parameters for the PDU session to be established for the UE;
        receiving from the network data analytics function a message including the one or more predicted load contribution factors which are indicative of a predicted load contribution at the user plane function instance for the PDU session to be established for the UE;
        performing a comparative assessment of load information factors from the sets of load information factors associated with the plurality of user plane function instances;
        wherein the comparative assessment takes into consideration the one or more predicted load contribution factors indicative of the predicted load contribution at the user plane function instance for the PDU session to be established for the UE; and
        selecting one of the plurality of user plane function instances for the PDU session of the UE based on the comparative assessment of the load information factors that takes into consideration the one or more predicted load contribution factors,
        wherein the one or more predicted load contribution factors which are indicative of the predicted load contribution are calculated at the network data analytics function with use of a model that is a function of the session-related parameters that are received as input.

2. The method of claim 1, wherein the set of load information factors associated with each user plane function instance further includes one or more current load information factors indicative of a current load or available capacity of the user plane function instance.

3. The method of claim 1, wherein the one or more predicted load information factors comprise one or more of a predicted throughput at the user plane function instance, a predicted central processing unit (CPU) utilization at the user plane function instance, a predicted memory utilization at the user plane function instance, a predicted number of sessions at the user plane function instance, and a predicted number of requests to be served at the user plane function instance.

4. The method of claim 1, wherein:
    the set of load information factors associated with each user plane function instance further includes a duration or time slot associated with at least one of the predicted load information factors, or
    the set of load information factors associated with each user plane function instance is associated with an implicit duration or time slot associated with at least one of the predicted load information factors.

5. The method of claim 1, further comprising:
    at the SMF, for each one of the plurality of user plane function instances:
        sending to the user plane function instance a message indicating a heartbeat request;
        receiving from the user plane function instance a message indicating a heartbeat response which includes the one or more predicted load information factors of the user plane function instance;

storing the one or more predicted load information factors in association with an identifier of the user plane function instance; and regularly repeating the sending, the receiving, and the storing.

6. The method of claim 1, wherein:

the model is built, using a model building process, based on historical usage data obtained from charging data records (CDR) of previous sessions of the UE, multiple UEs, or applications of the same or similar type as the UE, the multiple UEs, or the applications, and the model is regularly rebuilt, using a model optimization process, based on feedback data obtained from further CDRs of further sessions of the UE, multiple UEs, or applications of the same or similar type as the UE, the multiple UEs, or the applications.

7. The method of claim 1, wherein:

the model is or is based on a multiple linear regression model that is based on an expression $$\gamma=\beta_0+\beta_1 x_1+\beta_2 x_2+\ldots \beta_k x_k$$

or $$\gamma=\beta_0+\beta_1 x_1+\beta_2 x_2+\ldots \beta_k x_k+\epsilon$$

where $\gamma$ is a response variable which is an output that represents a predicted load contribution value or a value from which the predicted load contribution value may be derived, $\beta_1, \beta_2, \ldots \beta_k$ are regression coefficients that are derived based on historical usage data associated with previous sessions of the UE, multiple UEs, or applications of the same or similar type or context as the UE, the multiple UEs, or the applications, and $x_1, x_2, \ldots x_k$ are predictor variables to which the session-related parameters associated with the PDU session to be established for the UE are input.

8. The method of claim 1, further comprising:

at the SMF, after selecting, sending to the user plane function instance a message indicating a request for establishing a control plane session for managing the PDU session for the UE; and managing the PDU session for the UE in the control plane session, wherein the sending of the message indicating the request for establishing the control plane session includes the one or more predicted load contribution factors which are indicative of the predicted load contribution at the user plane function instance for updating, at the user plane function instance, the one or more predicted load information factors indicative of the total predicted load with the one or more predicted load contribution factors indicative of the predicted load contribution.

9. The method of claim 8, wherein the message indicating the request for establishing the control plane session includes the one or more predicted load contribution factors indicative of the predicted load contribution at the user plane function instance for the PDU session to be established for the UE, for use by the user plane function instance for generating the one or more predicted load information factors based on a plurality of predicted load contribution factors associated with a plurality of UEs being served by the user plane function instance.

10. The method of claim 1, wherein the one or more predicted load information factors associated with each user plane function instance are generated based on a plurality of predicted load contribution factors associated with a plurality of UEs being served by the user plane function instance.

11. The method of claim 1, wherein the model is derived based on historical usage data obtained from charging data records (CDR) of previous sessions of the UE, multiple UEs, or applications of the same or similar type as the UE, the multiple UEs, or the applications.

12. The method of claim 11, wherein:

the model is or is based on a multiple linear regression model, and the multiple linear regression model is based on an expression having a plurality of predictor variables to which the session-related parameters are input and a plurality of regression coefficients that are derived based on the historical usage data.

13. A network node comprising a session management function (SMF), the network node comprising:

one or more processors;

one or more interfaces configured to connect in a mobile network;

the one or more processors of the network node comprising the SMF being configured to:

maintain storage of a plurality of sets of load information factors, each set of load information factors being associated with a respective one of a plurality of user plane function instances and including one or more predicted load information factors indicative of a total predicted load at the user plane function instance;

receive a message indicating a request for establishing a protocol data unit (PDU) session for a user equipment (UE);

in response to the receiving, send to a network data analytics function a message indicating a request for one or more predicted load contribution factors for the PDU session to be established for the UE, the request including session-related parameters for the PDU session to be established for the UE;

receive from the network data analytics function a message including the one or more predicted load contribution factors which are indicative of a predicted load contribution at the user plane function instance for the PDU session to be established for the UE;

perform a comparative assessment of load information factors from the sets of load information factors associated with the plurality of user plane function instances;

wherein the comparative assessment takes into consideration the one or more predicted load contribution factors indicative of the predicted load contribution at the user plane function instance for the PDU session to be established for the UE; and select one of the plurality of user plane function instances for the PDU session of the UE based on the comparative assessment of the load information factors that takes into consideration the one or more predicted load contribution factors, wherein the one or more predicted load contribution factors which are indicative of the predicted load contribution are calculated at the network data analytics function with use of a model that is a function of the session-related parameters that are received as input.

14. The network node of claim 13, wherein the the set of load information factors associated with each user plane function instance further includes one or more current load information factors indicative of a current load or available capacity of the user plane function instance.

15. The network node of claim 13, wherein:
the session-related parameters comprise a day parameter, a time parameter, a device type parameter, a radio access technology (RAT) type parameter, and a subscription parameter.

16. The network node of claim 13, wherein the one or more processors of the network node comprising the SMF are further configured to:
for each one of the plurality of user plane function instances:
send to the user plane function instance a message indicating a heartbeat request;
receive from the user plane function instance a message indicating a heartbeat response which includes the one or more predicted load information factors of the user plane function instance;
store the one or more predicted load information factors in association with an identifier of the user plane function instance; and
regularly repeat the sending, the receiving, and the storing.

17. The network node of claim 13, wherein:
the model is built, using a model building process, based on historical usage data obtained from charging data records (CDR) of previous sessions of the UE, multiple UEs, or applications of the same or similar type as the UE, the multiple UEs, or the applications, and
the model is regularly rebuilt, using a model optimization process, based on feedback data from further CDRs of further sessions of the UE, multiple UEs, or applications of the same or similar type as the UE, the multiple UEs, or the applications.

18. The network node of claim 13, wherein:
the model is derived based on historical usage data obtained from charging data records (CDR) of previous sessions of the UE or multiple UEs or applications of the same or similar type.

19. The network node of claim 18, wherein:
the model is or is based on a multiple linear regression model that is based on an expression $$\gamma = \beta_0 + \beta_1 x_1 + \beta_2 x_2 + \ldots \beta_k x_k$$

or $$\gamma = \beta_0 + \beta_1 x_1 + \beta_2 x_2 + \ldots \beta_k x_k + \epsilon$$

where $\gamma$ is a response variable which is an output that represents a predicted load contribution value or a value from which the predicted load contribution value may be derived,
$\beta_1, \beta_2, \ldots \beta_k$ are regression coefficients that are derived based on the historical usage data associated with the previous sessions of the UE, the multiple UEs, or the applications of the same or similar type or context as the UE, the multiple UEs, or the applications, and $x_1, x_2, \ldots x_k$ are predictor variables to which the session-related parameters associated with the PDU session to be established for the UE are input.

20. A computer program product comprising:
a non-transitory computer readable medium;
instructions stored in non-transitory computer readable medium;
wherein the instructions comprise a session management function (SMF) which are executable by one of more processors of a network node for:
maintaining storage of a plurality of sets of load information factors, each set of load information factors being associated with a respective one of a plurality of user plane function instances and including one or more predicted load information factors indicative of a total predicted load at the user plane function instance;
receiving a message indicating a request for establishing a protocol data unit (PDU) session for a user equipment (UE);
in response to the receiving, sending to a network data analytics function a message indicating a request for one or more predicted load contribution factors for the PDU session to be established for the UE, the request including session-related parameters for the PDU session to be established for the UE;
receiving from the network data analytics function a message including the one or more predicted load contribution factors which are indicative of a predicted load contribution at the user plane function instance for the PDU session to be established for the UE;
performing a comparative assessment of load information factors from the sets of load information factors associated with the plurality of user plane function instances;
wherein the comparative assessment takes into consideration the one or more predicted load contribution factors indicative of the predicted load contribution at the user plane function instance for the PDU session to be established for the UE; and
selecting one of the plurality of user plane function instances for the PDU session of the UE based on the comparative assessment of the sets of load information factors that takes into consideration the one or more predicted load contribution factors,
wherein the one or more predicted load contribution factors which are indicative of the predicted load contribution are calculated at the network data analytics function with use of a model that is a function of the session-related parameters that are received as input.

* * * * *

UNITED STATES PATENT AND TRADEMARK OFFICE
CERTIFICATE OF CORRECTION

PATENT NO. : 11,412,412 B2
APPLICATION NO. : 16/742429
DATED : August 9, 2022
INVENTOR(S) : Bincy Baburaj Narath et al.

It is certified that error appears in the above-identified patent and that said Letters Patent is hereby corrected as shown below:

In the Claims

Claim 14, Column 34, Line 66, please replace "wherein the the set of" with --wherein the set of--

Signed and Sealed this
Twenty-seventh Day of September, 2022

Katherine Kelly Vidal
*Director of the United States Patent and Trademark Office*